United States Patent [19]
Kato et al.

[11] Patent Number: 5,617,162
[45] Date of Patent: Apr. 1, 1997

[54] DATA IMPRINTING DEVICE FOR A CAMERA HAVING CHANGEABLE IMAGE SIZE

[75] Inventors: Koji Kato; Hiroyuki Ando; Yukihiko Sugita, all of Tokyo; Hideaki Ichikawa, Nagano; Akira Inoue; Satoshi Miyazaki, both of Tokyo, all of Japan

[73] Assignee: Olympus Optical Co., Ltd., Tokyo, Japan

[21] Appl. No.: 656,408

[22] Filed: May 30, 1996

Related U.S. Application Data

[63] Continuation of Ser. No. 226,561, Apr. 12, 1994.

[30] Foreign Application Priority Data

Apr. 13, 1993 [JP] Japan ......................... 5-86461

[51] Int. Cl.⁶ .................................................. G03B 17/24
[52] U.S. Cl. ........................................................ 396/318
[58] Field of Search ...................................... 354/105, 106, 354/159, 94, 95, 96, 98, 99

[56] References Cited

U.S. PATENT DOCUMENTS

| | | | |
|---|---|---|---|
| 4,449,805 | 5/1984 | Sakurada et al. | 354/105 |
| 4,860,039 | 8/1989 | Hata et al. | 354/106 |
| 4,926,203 | 5/1990 | Hata et al. | 354/106 X |
| 4,973,997 | 11/1990 | Harvey | 354/106 |
| 4,994,830 | 2/1991 | Harvey | 354/106 |
| 5,057,857 | 10/1991 | Hata et al. | 354/106 |
| 5,245,373 | 9/1993 | Ogawa et al. | 354/106 |
| 5,349,402 | 9/1994 | Soshi et al. | 354/106 |
| 5,398,088 | 3/1995 | Yamazaki et al. | 354/106 |

FOREIGN PATENT DOCUMENTS

| | | |
|---|---|---|
| 62-103625 | 5/1987 | Japan . |
| 63-27823 | 2/1988 | Japan . |
| 3-210547 | 9/1991 | Japan . |

*Primary Examiner*—Howard B. Blankenship
*Attorney, Agent, or Firm*—Finnegan, Henderson, Farabow, Garrett & Dunner, L.L.P.

[57] ABSTRACT

To provide a data imprinting device for a camera which has a simple construction and does not make the main body of the camera large in size, a data imprinting device for a camera includes: an LED for optically generating data to be imprinted on a film surface; a prism for allowing data light generated by the LED to form an image on the film surface; a holder for holding the LED and the prism and disposed in such a manner as to be movable in a direction perpendicular to an optical axis for photographing of the camera; and data-imprinting-position changing means for moving the holder in interlocked relation with a changeover of a photographing image size on the film surface, and for changing a position of imprinting data on the film surface.

6 Claims, 21 Drawing Sheets

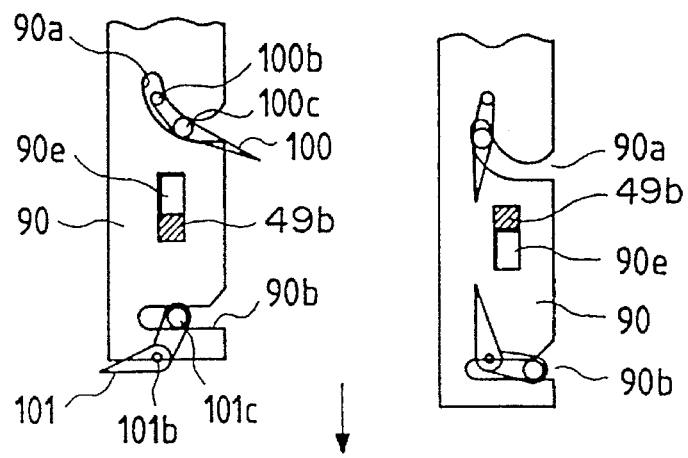
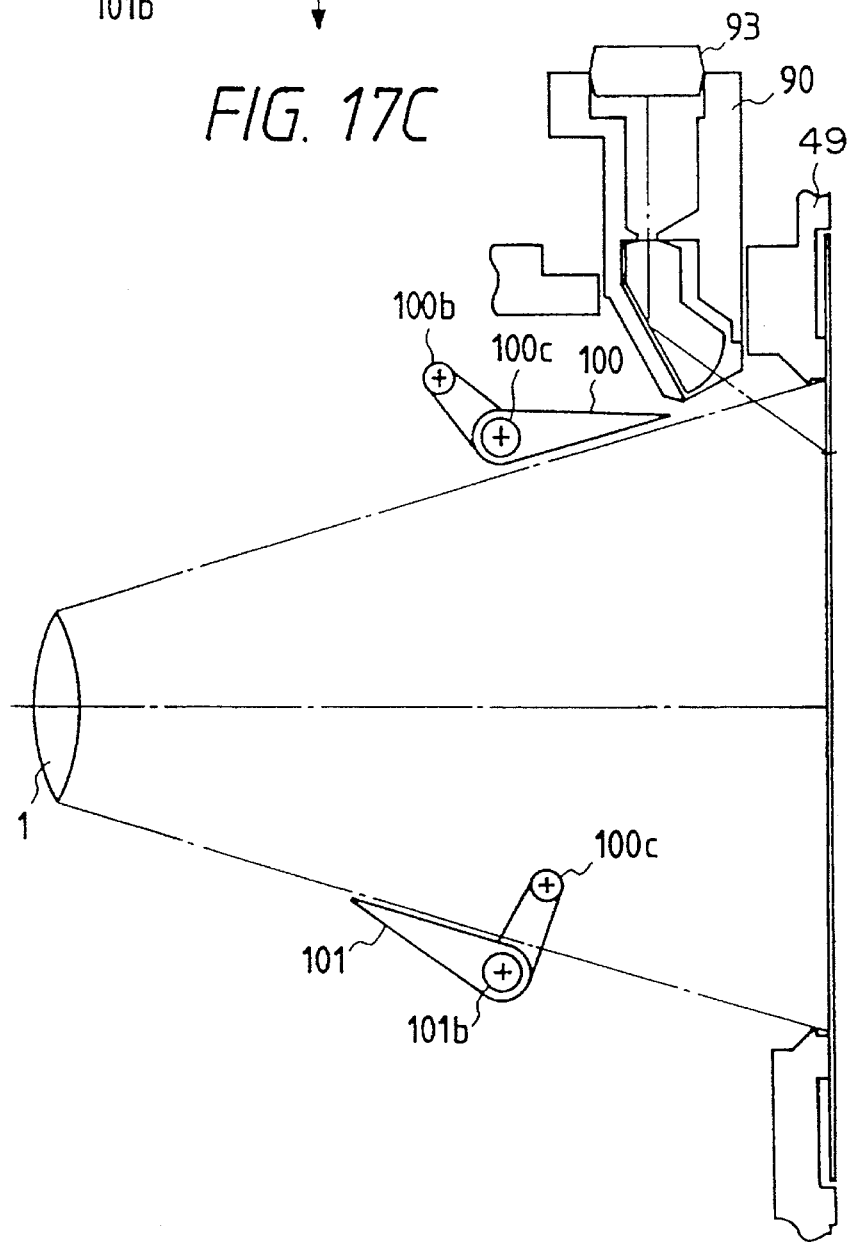

DATA IMPRINTING DEVICE FOR A CAMERA HAVING CHANGEABLE IMAGE SIZE

This is a continuation of application Ser. No. 08/226,561, filed Apr. 12, 1994.

BACKGROUND OF THE INVENTION

The present invention relates to a camera capable of changing over an image size, and more particularly to a data imprinting device in a camera in which a photographing image size can be changed over.

Conventionally, various types of data imprinting devices for cameras have been proposed. For instance, Japanese Patent Unexamined Publication No. 210547/1991 discloses a technical means in which a light source for data imprinting, a condenser lens, a transmission displaying body, and an image-forming lens are arranged in an upper portion of a main body of the camera so as to make the camera slim.

Also, Japanese Patent Unexamined Publication No. 3-210547 (corresponding to U.S. Pat. No. 5,245,373 to Ogawa et al.) discloses a camera in which a half-size and a full size are switchable. An optical system is switched over in cooperation of a switching operation of photographic image surface size and a size of data to be imprinted onto the film is changed for the switched imaged surface size. Also, this publication shows a data imprinting device having dot type LEDs disposed vertical to the film supply direction in the vicinity of the film supply surface. The LEDs are controlled to light in synchronism with the film supply.

Also, a data imprinting device for a trimming information recording camera is disclosed in Japanese Patent Unexamined Publication No. 103625/1987 which corresponds to U.S. Pat. Nos. 4,860,039, 4,926,203 and 5,057,857 all to Hata et al. The data imprinting device is arranged such that, in a camera capable of trimming photography, an imprinting section corresponding to a trimming is selected from a plurality of data imprinting sections according to the presence or absence of the trimming, and the position and size of data are changed.

However, in the structure disclosed in the above-described Japanese Patent Unexamined Publication No. 27823/1988, the imprinted position is always kept constant, and hence it would be difficult to apply this system to a photographic image surface switching type camera.

On the other hand, in the structure shown in the above-described Japanese Patent Unexamined Publication, since the image focusing system is moved relative to the data producing section, a very high precision positioning system is needed for maintaining the image forming relation, which requires high costs. Also, the data imprinting device has to be disposed between an aperture portion for exposure and a film cartridge chamber or between the aperture portion and a spool chamber. This would enlarge a size of the camera.

Furthermore, the structure shown in the above-described Japanese Patent Unexamined Publication No. 62-103625 needs a plurality of data imprinting devices, which would increase costs and enlarge the imprinting system itself.

SUMMARY OF THE INVENTION

In view of the foregoing defects and disadvantages inherent in the prior art systems, the present invention has been devised in view of the above-described problems, and its object is to provide a data imprinting device for a camera which has a simple construction and a high precision and does not make the main body of the camera large in size.

Another object of the invention is to provide a camera having a data imprinting device which may perform switching of the data imprinted position in association with the switching of the photographic image surface sizes with a simple construction and a high precision.

According to the present invention, these and other objects are attained by providing a camera in which a photographic image field size is switchable between a regular size and a panoramic size whose upper and lower fields have been shielded, the camera comprising:

a light emitting element for producing data to be imprinted onto a film surface, the light emitting element being composed of 7 LED segments which form a letter of eight;

an optical element for imprinting light of the data from the light emitting element onto the film surface;

holding means located in front of the film surface and above a photographic light flux for a photographing lens for holding the light emitting element and the optical element, the holding means being mounted on a camera body movable in a direction vertical to a photographic optical axis of the camera so that a position where the light of the data is imprinted onto the film surface may be changed in association with a switching of the photographic image field size; and a photographic image field mask movable a position where the photographic image field is shielded and a position where the photographic image field is not shielded, for changing the photographic image field size to the panoramic size in response to the movement of the holding means.

The optical element may be composed of a prism for introducing the light of data onto the film surface and a lens for focusing the light of data onto the film surface.

The photographic image field mask is rotatably mounted on the camera body, the photographic image field mask having a pin engaged with a cam groove formed in the holding means, whereby the photographic image field mask is rotatable in response to the movement of the holding means through the engagement between the cam groove and the pin.

According to another aspect of the invention, there is provided a camera in which a photographic image field size is switchable, the camera comprising:

means for optically producing data to be imprinted onto a film surface;

an optical element for photographing light of the data from the optically data producing means onto the film surface; and a holding means for holding the optically data producing means and the optical element, the holding means being movably mounted on a camera body for changing an imprinting position of the light of data on the film surface in response to switching of the image field size.

The holding means may be mounted movably up and down on the camera body. The holding means may also be mounted rotatably on the camera body. The holding means is disposed on an upper portion of the camera body for imprinting the light of data obliquely downwardly. The optically data producing means includes a light emitting element composed of seven segments forming a letter of eight, and a lower segment side is longer than an upper segment side.

According to the present invention, there is provided a camera in which a photographic image field size is switchable, the camera comprising:

means for optically producing data to be imprinted onto a film surface;

an optical element for photographing light of the data from the optically data producing means onto the film surface; and a holding means for holding the optically data producing means and the optical element, the holding means being disposed movably in the camera body for changing an imprinting position of the light of data on the film surface in response to switching of the image field size.

According to the invention, there is provided a camera in which a photographic image field size is switchable between a regular size and a panoramic size whose upper and lower fields have been shielded, the camera comprising:

a light emitting element for producing data to be imprinted onto a film surface, the light emitting element being composed of 7 LED segments which form a letter of eight;

an optical element for imprinting light of the data from the light emitting element onto the film surface, the optical element being composed of a prism for introducing the light of data onto the film surface and a lens formed integrally with the prism;

holding means located for holding the light emitting element and the optical element, the holding means being disposed in front of the film surface and above a photographic light flux for a photographing lens, the holding means being movable in a direction vertical to a photographic optical axis of the camera; and data imprinting position changing means for moving the holding means in response to switching of the photographic image field size to thereby change a position of data imprinting on the film surface.

According to the invention, there is provided a camera in which a photographic image field size is switchable between a regular size and a panoramic size whose upper and lower fields have been shielded, the camera comprising:

a light emitting element for producing data to be imprinted onto a film surface, the light emitting element being composed of 7 LED segments which form a letter of eight;

a lens for focusing a light of the data from the light emitting element onto the film surface;

holding means for holding the light emitting element and the optical element, the holding means being mounted in front of the film surface and above a photographic light flux for a photographing lens, the holding means being movable in a direction close to and in a direction away from a photographic optical axis of the camera; and data imprinting position changing means for angularly moving the holding means in response to switching of the photographic image field size to thereby change a position of data imprinting on the film surface.

According to the present invention, there is provided a camera in which a photographic image field size is switchable between a regular size and a panoramic size whose upper and lower fields have been shielded, the camera comprising:

a light emitting element for producing data to be imprinted onto a film surface;

an imprinting lens for imprinting a light of the data from the light emitting element onto the film surface; and holding means for holding the light emitting element and the imprinting lens, the holding means being mounted in front of the film surface and above a photographic light flux for a photographing lens, the holding means being angularly movable between two directions close to and away from a photographic optical axis of the camera and for changing position of data imprinting on the film surface in response to switching of the photographic image field size.

A toggle spring is interposed between the holding means and the camera body so that the holding means may be selectively biased between the two positions. The imprinting lens is slidable along the holding means so that a size of the imprinted light of data is changed in response to a angular motion of the holding means between the two positions. The imprinting lens is composed, in combination, of two kind of lens elements having different curvatures of radius so that a size of the imprinted light of data varies, and the imprinting lens is rotatably mounted on the holding means so as to be located in a data optical path of one of the two kind of lens elements in response to a angular motion of the holding means between the two positions. A light emitting period of the light emitting element varies in response to an angular motion of the holding means between the two positions. The optically data producing means includes a light emitting element composed of seven segments forming a letter of eight, and a lower segment side is longer than an upper segment side.

According to the present invention, there is provided a camera having a film transporting device and a data imprinting device which is capable of switching a size of a photographic image field to be imprinted on a surface of photographic film, the camera comprising:

a light emitting element for producing data to be imprinted onto a film surface;

an imprinting lens for imprinting a light of the data from the light emitting element onto the film surface; and holding means for holding the light emitting element and the optical element, the holding means being mounted movably on a camera body so as to change an imprinting position of the light of data onto the film surface in response a switching operation of the photographic image field size; and control means for controlling the light emitting element to intermittently light in response to the data during a feed movement of the film.

According to the present invention, there is provided a data imprinting device for a camera which is capable of switching a size of a photographic image field to be imprinted onto a film surface, the device comprising:

data producing means for optically producing data to be imprinted onto the film surface;

an optical element for imprinting a light of data from the data producing means onto the film surface;

holding means for the data producing means and the optical element, the holding means is disposed movably relative to a camera body so as to change an imprinting position of the light of data on the film surface in response to a switching operation of the photographic image field size; and a viewfield mask for switching viewfields of a viewfinder, the viewfield mask switching over the viewfields of the viewfinder in response to a movement of the holding means.

According to the present invention, there is provided a camera for imprinting information data, comprising:

means for switching image surface whose size is switchable; and data imprinting means including a data forming portion for forming data to be imprinted on the image surface in response to the switching of the image field and an image forming system for forming an image on the formed image surface, the data forming portion and the image forming system being movable together in cooperation with the switching of the image surface.

The data imprinting means may be movable in parallel with the image surface. The data imprinting means may be angularly movably disposed.

According to the present invention, there is provided a camera for imprinting information data, comprising:

means for switching image surface whose size is switchable; and data imprinting means including a data forming portion for forming data to be imprinted on the image surface in response to the switching of the image field and an image forming system for forming an image on the formed image surface, the image forming system a magnification changing means for changing an image magnification in cooperation with the switching of the image surface, the data forming portion and the image forming system being movable together in cooperation with the switching of the image surface.

The magnification changing means including a means for moving the image forming system in an axial direction of the image forming system in cooperation with the switching of the image surface. The data imprinting means is angularly movably disposed. The image forming system of the magnification changing means including a plurality of image forming systems, and selectively using either one of the plurality of image forming systems. The image forming system includes an integrally formed optical member composed of two kinds of lens systems whose optical axes intersect with each other and have different focal lengths from each other, and either one of the lens systems is located between the data forming portion and the image surface.

According to the present invention, there is provided a camera comprising:

means for switching image sizes; and means for recording data on a film, the data recording means integrally holding a data producing portion and an image forming system, wherein the data recording means is moved in cooperation with an operation of the switching of the image sized so that data are recorded onto the film.

BRIEF DESCRIPTION OF THE DRAWINGS

In the accompanying drawings:

FIGS. 17A and 17B are diagrams of a D holder and its peripheral components in the data imprinting device for a camera in accordance with the embodiment, FIG. 17A being a side elevational view illustrating a normal state, and FIG. 17B being a side elevational view illustrating a panoramic state;

FIG. 17C is a schematic side elevational view showing a relationship of the film imprinting system and the image size change-over mechanism according to the present invention;

DESCRIPTION OF THE PREFERRED EMBODIMENTS

Hereafter, a description will be given of the present invention by means of the illustrated embodiments.

Figure 1:
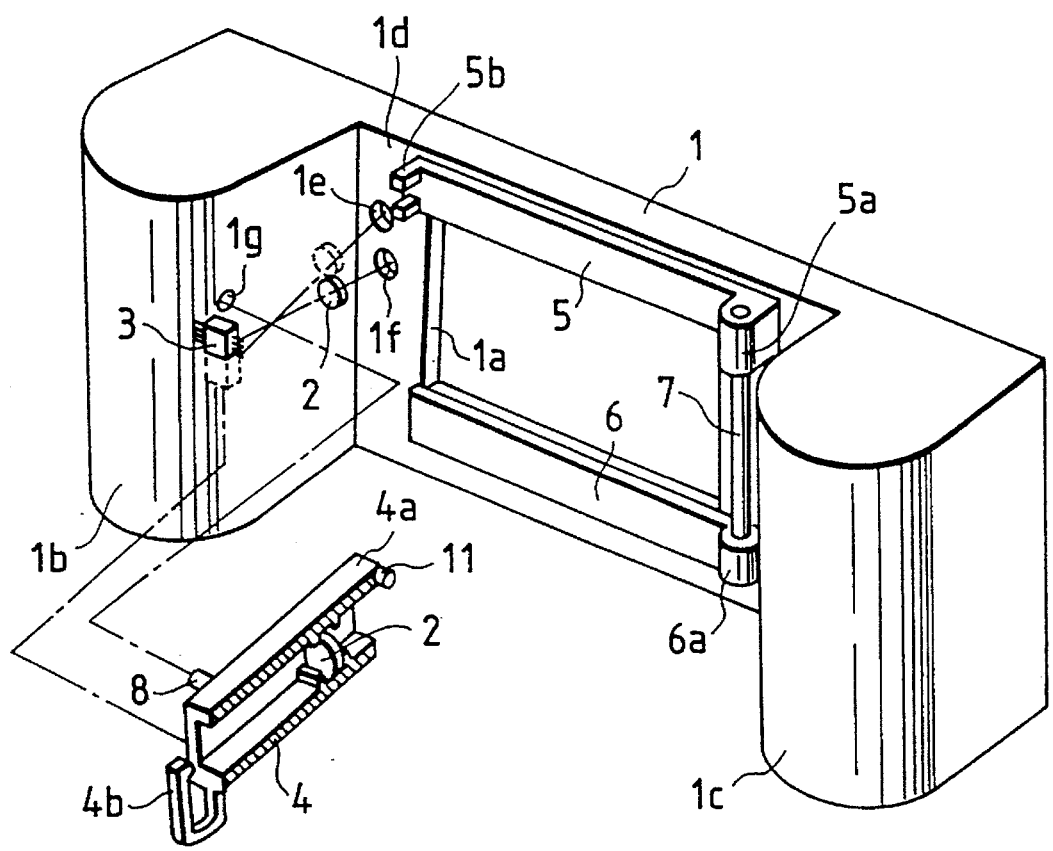
FIG. 1 is an exploded perspective view of essential portions of a data imprinting device in an image-size changeable camera, and illustrates a first embodiment of the present invention.
Figure 2:
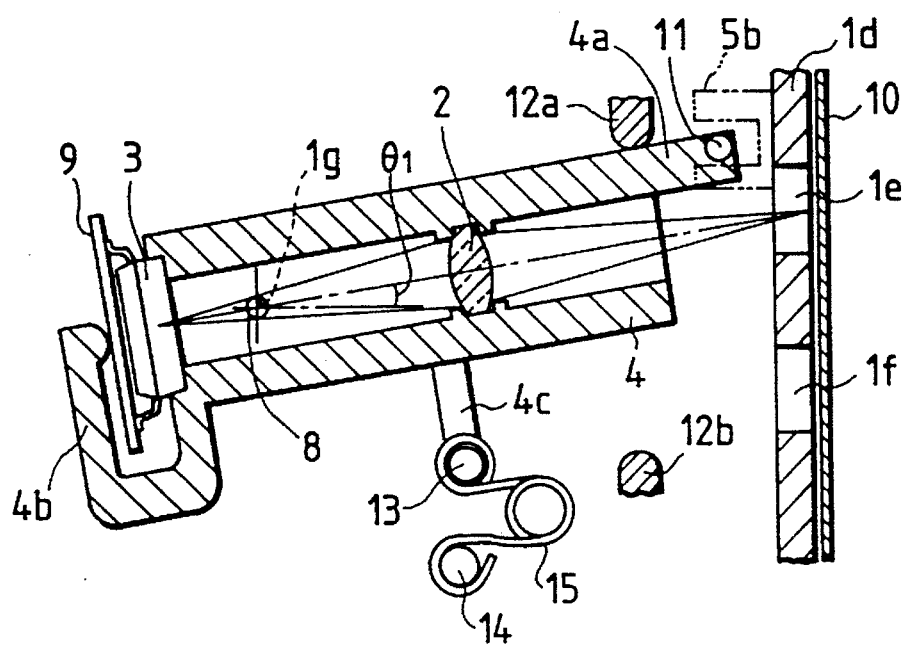
FIG. 2 is a cross-sectional view illustrating a state of data imprinting with a normal image size in the data imprinting device in accordance with the first embodiment.
Figure 3:
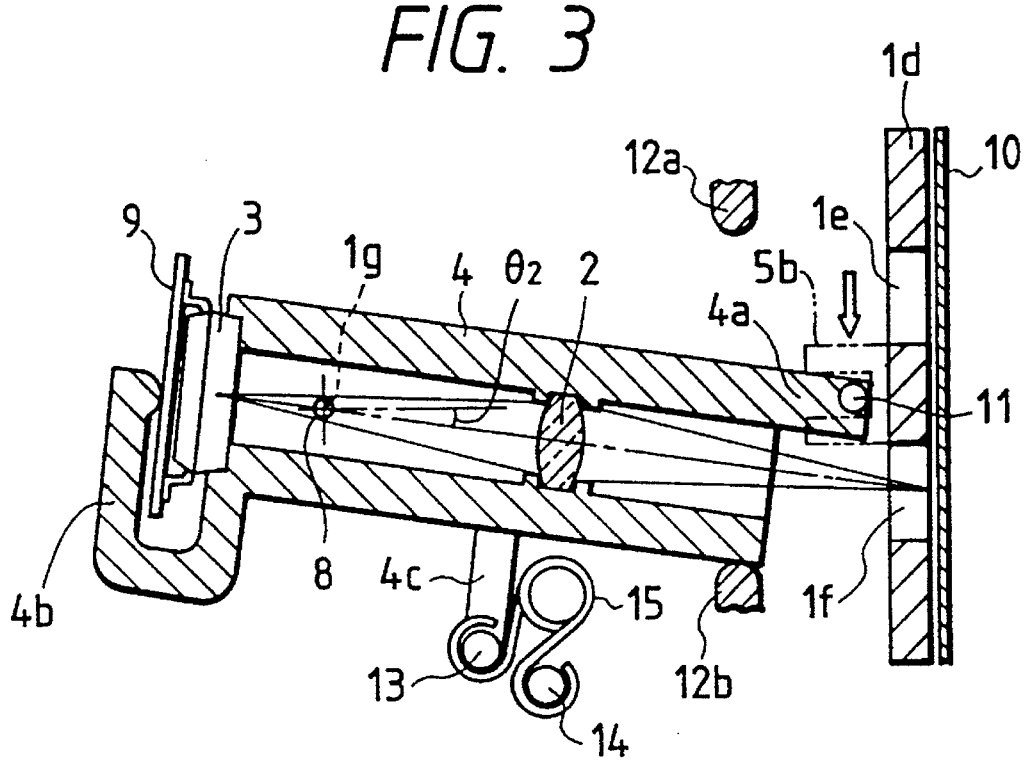
FIG. 3 is a cross-sectional view illustrating a state of data imprinting with a panoramic image size in the data imprinting device in accordance with the first embodiment.

FIGS. 1 to 3 show details of a data imprinting device in an image-size changeable camera, and illustrates a first embodiment of the present invention.

It should be noted that, as for the camera in each of the embodiments which will be described below, a description will be given of one which uses a 35-mm roll film, and whose photographing image size can be changed over between a normal size which is called the Leica size with a horizontal length of 36 mm and a vertical length of 24 mm and an image size which is smaller than the same and is called a panoramic size with a horizontal length of 36 mm and a vertical size of 13 mm. However, it goes without saying that the camera to which the present invention is applicable is not confined to the same.

FIG. 1 is a front perspective view of essential portions of a main body 1 of the camera. An aperture 1a defining the aforementioned photographing image size is formed in a central portion of the main body 1 of the camera. A film feeding chamber 1c in which a film cartridge is loaded and a film take-up chamber 1b for accommodating a film spool are respectively formed integrally in the main body 1 of the camera on both sides thereof with this aperture 1a placed therebetween.

The aperture 1a is formed with the aforementioned normal image size. Disposed in front of the aperture 1a are an upper changeover mask plate 5 and a lower changeover mask plate 6 for forming the image size of the panoramic size in such a manner as to movably cover upper and lower edges of the aperture 1a, respectively. Namely, a support shaft 7 is fixed in a vertical direction on one side of the aperture 1a of the main body 201 of the camera. Fitted to the support shaft 7 are a proximal portion 5a of the upper changeover mask plate 5 and a proximal portion 206a of the lower changeover mask plate 6 in such a manner as to be vertically movable so as to move in mutually opposite directions. These changeover mask plates 5 and 6 are operated by an unillustrated changeover operation member so as to be changed over between the normal image-size position for opening the front of the aperture 1a from outside the camera body and the position for forming the image size of the panoramic size by covering the upper and lower edge portions of the aperture 1a.

The upper changeover mask plate 5 has a fork 5b provided at a distal end portion opposite to the proximal portion 205a thereof. This fork 5b is associated with the data imprinting device which will be described next, and changes a data imprinting cylinder 4 in interlocking relation with the image-plane changeover operation of the upper changeover mask plate 5 in such a manner as to correspond to the photographic image plane selected.

The data imprinting device is disposed in face-to-face relation with a main-body wall 1d of the camera between the aperture 1a and the film take-up chamber 1b. Main components of this imprinting device are comprised of an imprinting hole 201e for the normal image size and an imprinting hole 1f, which are formed in upper and lower positions in the main-body wall 201d of the camera in correspondence with the data-imprinting position on a film 10 (see FIGS. 2 and 3) stretched on the rear side of the aperture 1a, as well as the data imprinting cylinder 4 whose distal-end opening is located in such a way as to oppose either one of these holes 1e and 1f.

The data imprinting cylinder 4 is formed of an elongated rectangular cylinder in which an image-forming lens 2, i.e., the image-forming optical system, an imprinting-data displaying LED 3 (see FIGS. 2 and 3), i.e., the data-generating means, and the like are provided. An extending portion 4a extending further forward is formed integrally at an upper edge of the distal-end opening of the data imprinting cylinder 4. A resilient U-shaped LED-supporting portion 4b is formed integrally at a lower edge of the rear-end opening of the data imprinting cylinder 4. Furthermore, a spring-retaining projection 4c is formed integrally at an intermediate position on the lower side of the data imprinting cylinder 4 in such a manner as to project downward.

The image-forming lens 2 provided in this data imprinting cylinder 4 is disposed at a position offset slightly toward the forward position from the intermediate position within the cylinder. The image-forming lens 2 serves to form an image at the data-imprinting position on the film 10 via the imprinting hole 1f or 1e by means of a display light image from the imprinting-data displaying LED 3 disposed in the rear-end opening by the LED-supporting portion 4b. The imprinting-data displaying LED 3 is for generating data to be imprinted on the film, and is arranged on a flexible printed board 9 (see FIGS. 2 and 3), such that its display surface is fitted in the rear-end opening of the data imprinting cylinder 4, and the rear surface of the printed board 9 is pressed by the LED-supporting portion 4b.

In the data imprinting cylinder 4 thus arranged, an imprinting-cylinder holding support shaft 8 is fixedly embedded in an outer side wall opposing an inner side wall of the film take-up chamber 1b. This support shaft 8 is embedded in the outer side wall at a position closer to the rear end, and rotatably supports the data imprinting cylinder 4 as the support shaft 8 is loosely fitted in a holding hole 1b formed in the inner side wall of the film take-up chamber 1b. A connecting pin 11 which is fixedly embedded in the extending portion 4a is fitted in the fork 5b of the upper changeover mask plate 5.

Accordingly, when the normal image size is selected and the upper changeover mask plate 5 is moved upward to fully open the aperture 1a, the connecting pin 11 is moved upward by the fork 5b, thereby causing the data imprinting cylinder 4 to rotate counterclockwise about the support shaft 8. Meanwhile, when the image size of the panoramic size is selected and the upper changeover mask plate 5 is moved downward to cover the upper portion of the aperture 1a, the connecting pin 11 is moved downward by the fork 5b, thereby causing the data imprinting cylinder 4 to rotate clockwise about the support shaft 8.

In addition, these rotational positions are accurately restricted by stopper members 12a and 12b, respectively.

The data imprinting cylinder 4 is urged in such a manner as to abut against the stopper members 12a and 12b by means of a toggle spring 15 (see FIGS. 2 and 3) stretched between a pin 13 provided on the spring-retaining projection 4c and a fixed pin 14 provided on an immovable member.

Next, a description will be given of the operation of the data imprinting device in the image-size changeable camera thus arranged.

First, a description will be given of a case where the normal image size is selected by operating the changeover operation member from outside the camera body. As a result of the operation of the changeover to the normal image size, the upper changeover mask plate 5 and the lower changeover mask plate 6 move upward and downward, respectively, thereby fully opening the aperture 1a. Then, since the connecting pin 11 is moved upward by the fork 5b, the data imprinting cylinder 4 rotates counterclockwise about the support shaft 8, and is urged by the toggle spring 215, and is made stationary at the position where it abuts against the upper stopper member 12a, as shown in FIG. 2. This position is the position where the distal-end opening of the data imprinting cylinder 4 is opposed to the imprinting hole 201e for the normal image size. Accordingly, if desired data to be imprinted is displayed by the imprinting-data displaying LED 3 through light emission in synchronism with the winding of the photographed film, that data are imprinted at a predetermined position on the film 10 via the imprinting hole 1e by means of the image-forming lens 2.

Next, if the photographing image size is changed over to the image size of the panoramic size, the upper changeover mask plate 5 and the lower changeover mask plate 6 are moved downward and upward, respectively, by that changeover operation, thereby setting the aperture to the panoramic size by covering the upper and lower edge portions of the aperture 1a. Then, since the connecting pin 11 is moved downward by the fork 5b, the data imprinting cylinder 4 is rotated clockwise about the support shaft 8, is urged by the resiliency of the toggle spring 15 at a point exceeding a neutral point, and is made stationary at the position where it abuts against the lower stopper member 12b, as shown in FIG. 3. This position is the position where the distal-end opening of the data imprinting cylinder 4 is opposed to the imprinting hole 1f for the panoramic image size. Accordingly, if desired data to be imprinted is displayed by the imprinting-data displaying LED 3 through light emission in synchronism with the winding of the photographed film, that data are imprinted at a predetermined position on the film 10 via the imprinting hole 1f by means of the image-forming lens 2.

In addition, in this embodiment, since the support shaft 8 of the data imprinting cylinder 4 is disposed in the vicinity of the optical axis of the image-forming lens 2, and a counterclockwise rotational angle θ1 and a clockwise rotational angle θ2 are made substantially equal, it is possible to form a focused image at both positions on the film. Incidentally, in such a structure, if an upper side would be equal to a lower side, in a photographing mode with a normal image size, the imprinted letters would be unbalanced with the upper side being longer than the lower side. If the rotational angles θ1 and θ2 are 30 degrees or less, the image quality is of such a level that the deformation of the characters does not present a problem. In the event that the deformation of the characters is noticeable to an annoying degree, it is possible to obtain well-balanced imprinted characters by deforming the characters in advance.

Figure 10A:
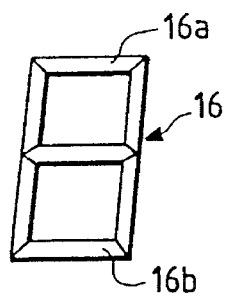
FIGS. 10A, 10B and 10C are diagrams showing examples of a data character for imprinting a data character with a good balance in the data imprinting device.
Figure 10B:
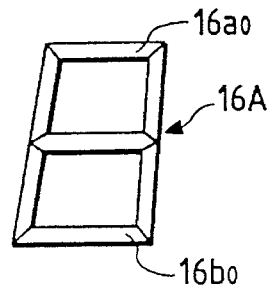
Figure 10C:
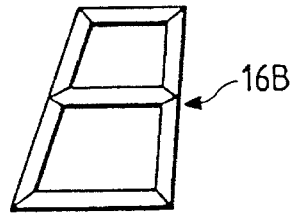

FIG. 10(A) shows an example thereof. Namely, in this example, a numeric LED 16 comprised of seven segments is used. The sizes of upper and lower segments 16a and 16b of the LED 16 are formed such that horizontal length of the segment 16a on the upper side is slightly smaller than the horizontal length of the segment 16b on the lower side as shown in FIG. 10(A), so that when the photographing image size is changed over to the image size of the panoramic size, the sizes of an upper side $16a_0$ and a lower side $16b_0$ in a character 16A which is imprinted on the film become substantially equal as shown in FIG. 10(B). If this arrangement is adopted, the character which is imprinted on the film at the time of the panoramic size becomes equal on upper and lower sides, and the balance improves, as shown in FIG. 10(B).

However, in this case, when the image size is changed over to the normal image size, the shape of a character 16B which is formed on the film becomes further narrower at the top. The larger the lower side of the character, the better the balance. This could not raise a serious problem.

In accordance with the above-described embodiment, the positional relationship for image formation is determined by the data imprinting cylinder 4 and the main body 1 of the camera, and the positional relationship between the LED 3 and the image-forming lens 2 is determined by a single component, i.e., the data imprinting cylinder 4. Accordingly, it is readily possible to obtain positional accuracy. In addition, as for expensive data imprinting sections, only one unit is required, and the alteration of the data-imprinting position becomes possible without requiring electrical processing.

Figure 4:
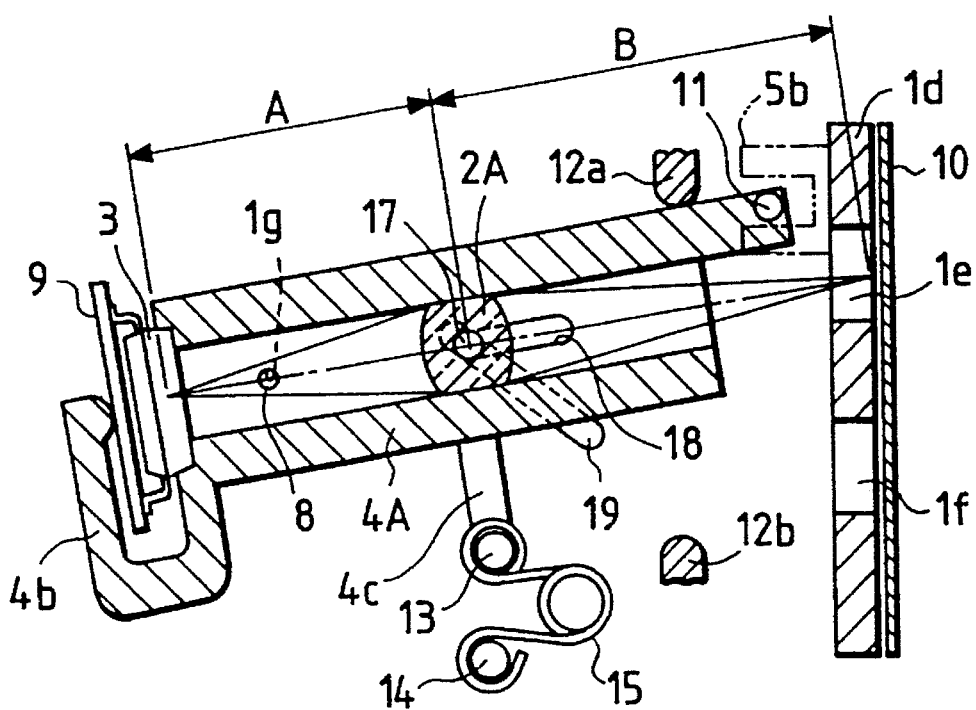
FIG. 4 is a cross-sectional view illustrating a state of data imprinting with the normal image size in a data imprinting device in an image-size changeable camera, and illustrates a second embodiment of the present invention.
Figure 5:
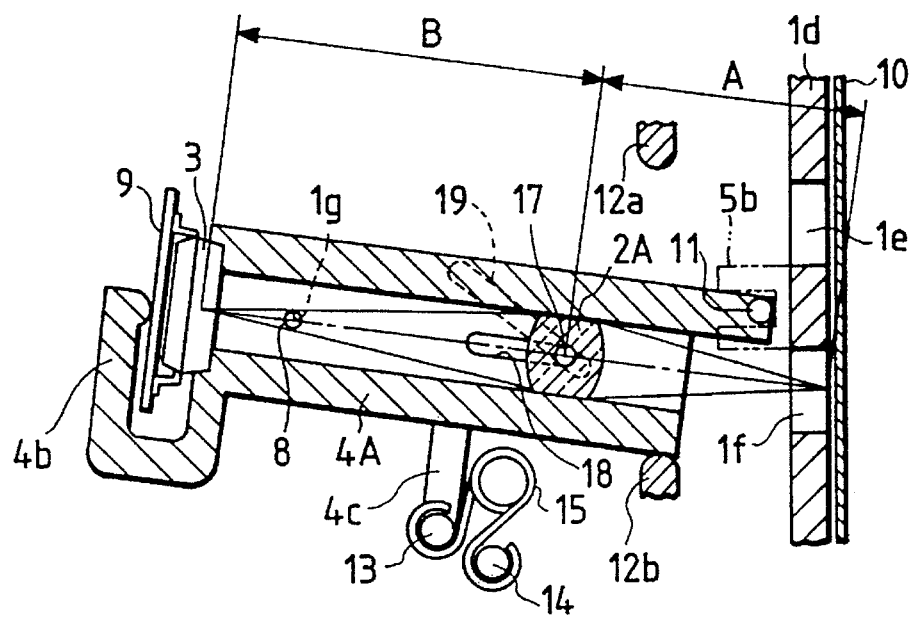
FIG. 5 is a cross-sectional view illustrating a state of data imprinting with the panoramic image size in the data imprinting device in accordance with the second embodiment.

FIGS. 4 and 5 show a second embodiment of the present invention. The data imprinting device in an image-size changeable camera in accordance with this second embodiment is arranged in a manner substantially similar to that of the data imprinting device in accordance with the first embodiment, but differs from the same in that an image-forming lens 2A is adapted to move in the direction of the optical axis between the normal image size position and the panoramic image size position.

That is, the image-forming lens 2A is held in a data imprinting cylinder 4A movably in the direction of the optical axis. A moving pin 17 which is fixedly embedded in a side surface of the image-forming lens 2A is passed through a guiding slit 18 formed in a side wall of the data imprinting cylinder 4A in parallel with the direction of the optical axis, and extends outside the cylinder. The guiding slit 18 is formed in such a manner as to extend from an approximately intermediate position to a position offset toward the front portion of the data imprinting cylinder 4A. A distal end of the moving pin 17 is fitted in an inclined cam groove 19 for moving which is formed in the main body of the camera. Accordingly, when the data imprinting cylinder 4A is rotated about the support shaft 8, in response to its rotational direction, the image-forming lens 2A moves from the approximately intermediate position to the position offset toward the front portion within the data imprinting cylinder 4A, and vice versa.

Since the other arrangements are similar to those of the first embodiment, identical component members will be denoted by the same reference numerals and a description thereof will be omitted.

In the data imprinting device in accordance with the second embodiment thus arranged, in a case where the normal image size is selected, the connecting pin 11 is moved upward by the fork 5b of the upper changeover mask plate 5, as shown in FIG. 4. Hence, the data imprinting cylinder 4A rotates counterclockwise about the support shaft 8, so that the image-forming lens 2A moves to the approximately intermediate position by means of the moving pin 17 fitted in the inclined cam groove 19. The data is imprinted at this position.

Next, if the photographing image size is changed over to the image size of the panoramic size, the upper changeover mask plate 5 moves downward by means of the changeover operation, and the connecting pin 11 moves downward by means of its fork 5b, so that the data imprinting cylinder 4A rotates clockwise about the support shaft 8. Hence, the image-forming lens 2A moves from the approximately intermediate position to the position offset toward the front portion by means of the moving pin 17 fitted in the inclined cam groove 19, as shown in FIG. 5. The data is imprinted at this position.

If it is assumed that the distance between the LED 3 and the image-forming lens 2A is B, and that the distance between the image-forming lens 2A and the film 10 is A, the image-forming relationship becomes an exactly inverted relationship. In this case, if it is assumed that the magnification of imprinting with the normal image size is 1, the imprinting magnification after the changeover to the panoramic image size is reduced to $B^2/A^2$, thereby making it possible to reduce the data characters to be imprinted. It goes without saying that the data characters may be enlarged depending on how the distances A and B are determined.

Thus, in accordance with the second embodiment, it is possible to obtain the advantage that the size of the data characters to be imprinted can be changed arbitrarily without impairing the characteristics of the above-described first embodiment.

Figure 6:
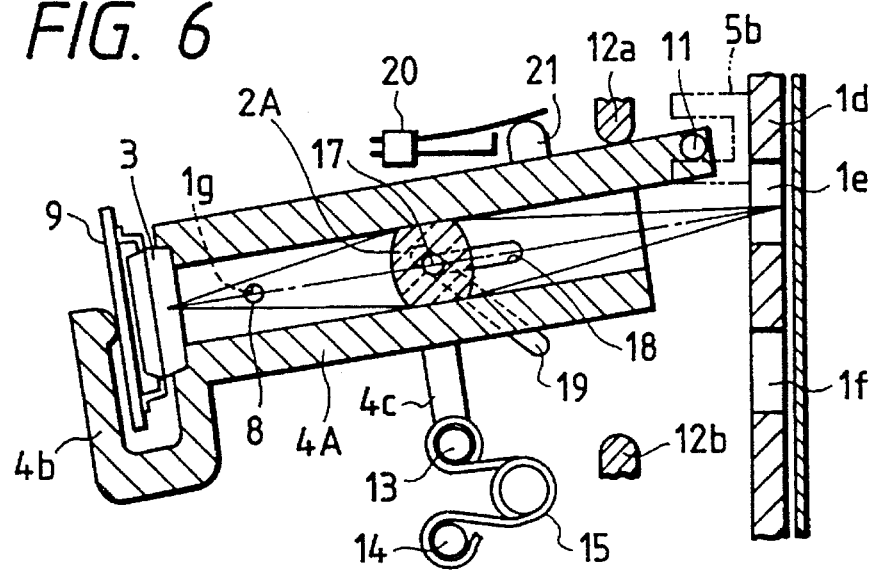
FIG. 6 is a cross-sectional view illustrating a state of data imprinting with the normal image size in a data imprinting device in an image-size changeable camera, and illustrates a third embodiment of the present invention.
Figure 7:
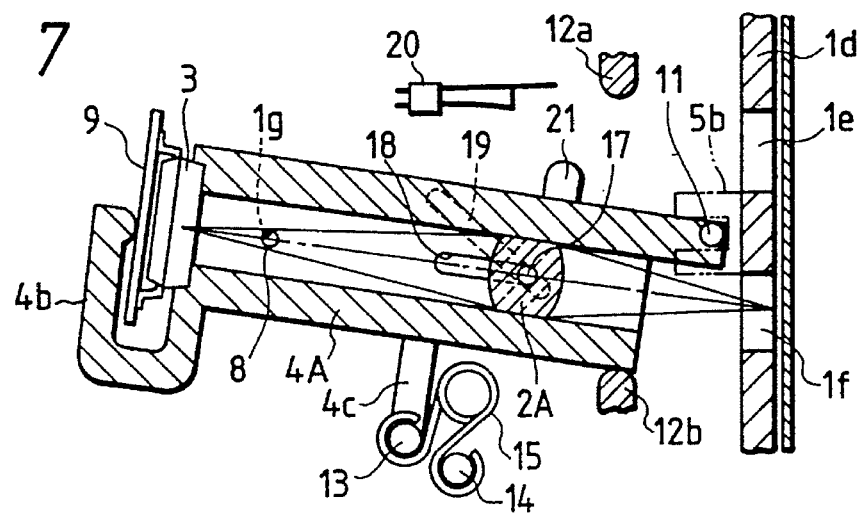
FIG. 7 is a cross-sectional view illustrating a state of data imprinting with the panoramic image size in the data imprinting device in accordance with the third embodiment.

FIGS. 6 and 7 show a third embodiment of the present invention. The data imprinting device in an image-size changeable camera in accordance with this third embodiment is one in which a changeover-position detecting switch 20 is added to the data imprinting device of the second embodiment. The other arrangements are utterly the same as those of the data imprinting device of the second embodiment.

Namely, if a configuration is given as in the second embodiment, in a case where the magnification of the imprinting of data characters is altered, a change takes place in the effective f-number as a consequence of the change in the magnification. Therefore, if the change in the magnification is made large, an over- or under-exposure would result unless the light-emitting time of the LED 3 is altered.

Accordingly, in this embodiment, the data imprinting cylinder 4A is provided with a switch opening/closing projection 21 and the changeover-position detecting switch 20 which is opened or closed by the same, so as to control the light-emitting time of the LED 3. Namely, the changeover-position detecting switch 20 is set in such a manner as to be turned off during photographing with the normal image size shown in FIG. 6, and to be turned on during photographing with the panoramic image size shown in FIG. 7. The light-emitting time of the LED 3 is altered by a control circuit by means of on/off signals of this changeover-position detecting switch 20.

Figure 6A:
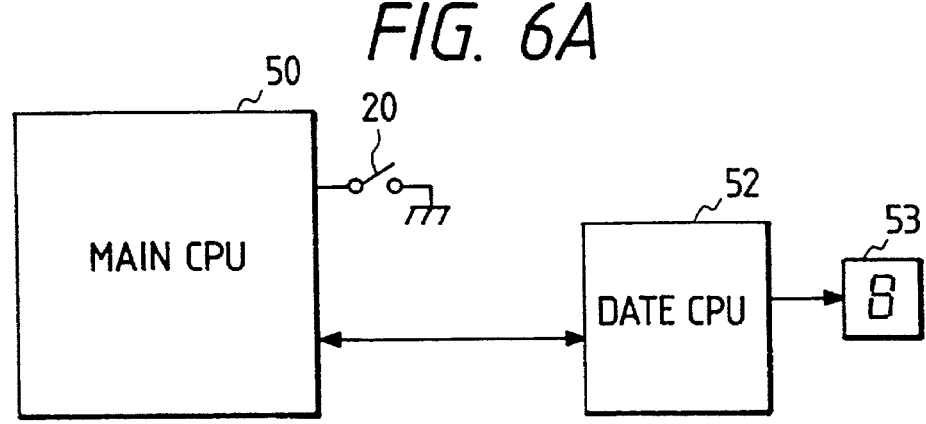
FIG. 6A is a block diagram showing a circuit which is applicable to the system shown in FIG. 6.

If this arrangement is adopted, it is possible to obtain an appropriate imprinting exposure. In addition, in case of the projection during the transportation of the film, it is also possible to change the light-emitting interval of the LED by means of these signals so as to obtain character intervals optimally suited to the character magnification. For this purpose, for example, a control circuit shown in FIG. 6A may be used, in which a main CPU receives the signal from the switch 20 and is connected to a date CPU 52 through a data bus for controlling the exposure time of the imprinted letter 53.

In accordance with the third embodiment, data can be imprinted with higher quality by the addition of a single switch.

Figure 8:
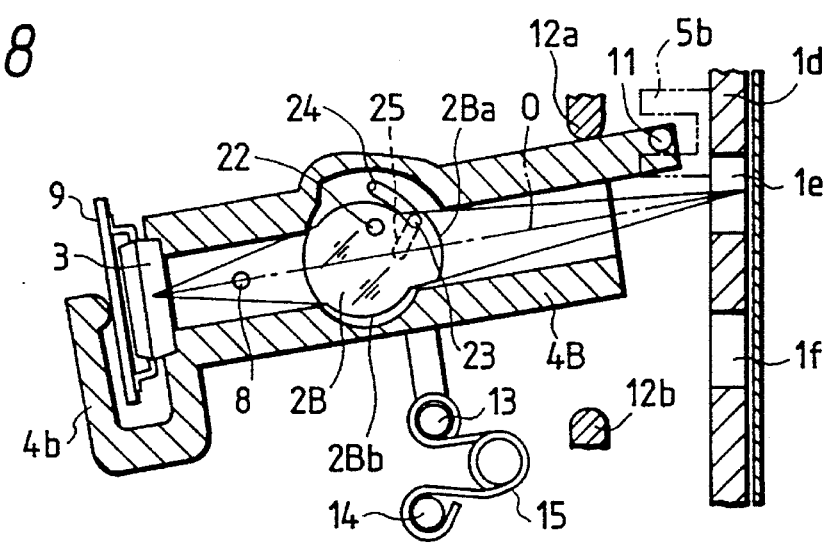
FIG. 8 is a cross-sectional view illustrating a state of data imprinting with the normal image size in a data imprinting device in an image-size changeable camera, and illustrates a fourth embodiment of the present invention.
Figure 9:
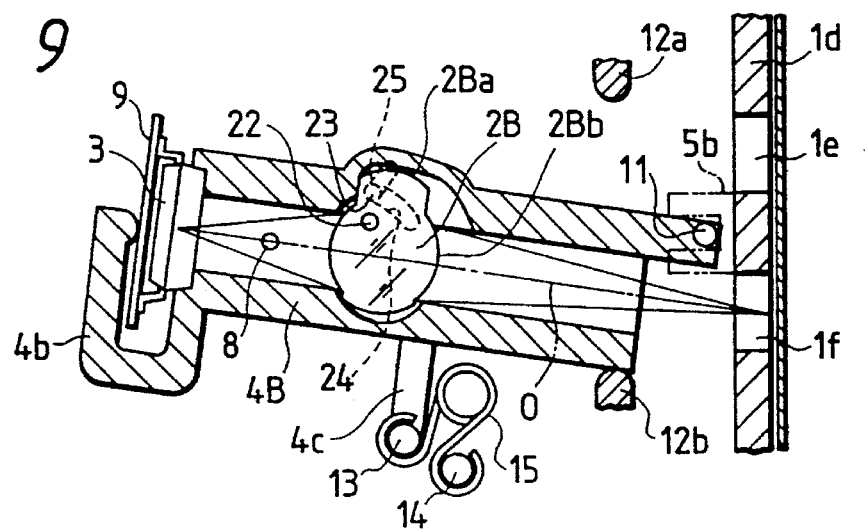
FIG. 9 is a cross-sectional view illustrating a state of data imprinting with the panoramic image size in the data imprinting device in accordance with the fourth embodiment.

FIGS. 8 and 9 show a fourth embodiment of the present invention. In the data imprinting device in an image-size changeable camera in accordance with this fourth embodiment, an image-forming lens 2B is comprised of a lens having two different curved surfaces 2Ba and 2Bb, and this image-forming lens 3B is rotated within a data imprinting cylinder 4B, so as to alter the magnification of the imprinting of data characters.

Namely, the image-forming lens 2B is a lens in which two optical axes of a lens having the curved lens surface 2Ba and a lens having the curved lens surface 2Bb intersect each other. As shown in FIG. 8, the lens having the curved lens surface 2Ba forms an image-forming lens for imprinting data light on the film in face-to-face relation with the film surface during photographing with the normal image size. As shown in FIG. 9, the lens having the curved lens surface 2Bb forms an image-forming lens for imprinting data light on the film in face-to-face relation with the film surface during photographing with the panoramic image size which is a smaller size than the normal image size.

The image-forming lens 2B is rotatably held in the data imprinting cylinder 4B as a support shaft 22 which is fixedly embedded in one side surface of the image-forming lens 2B is rotatably fitted in the data imprinting cylinder 4B. Furthermore, a rotating pin 23 which is fixedly embedded in a side surface of the lens 2B in the vicinity of the support shaft 22 is passed through a partially arcuate guiding hole 24 formed in the data imprinting cylinder 4B, extends outside the cylinder, and is fitted in an inclined cam groove 25 for moving which is formed in the main body of the camera. Accordingly, when the data imprinting cylinder 4B is rotated about the support shaft 8, the image-forming lens 2B rotates about the support shaft 22 by means of the inclined cam groove 25, and the curved lens surface 2Ba on the optical axis 0 is replaced by the curved lens surface 2Bb, and vice versa.

Since the other arrangements are similar to those of the first embodiment, identical component members will be denoted by the same reference numerals and a description thereof will be omitted.

In the data imprinting device in accordance with the fourth embodiment thus arranged, in a case where the normal image size is selected, the connecting pin 11 is moved upward by the fork 205b of the upper changeover mask plate 5 (see FIG. 1), as shown in FIG. 8. Hence, the data imprinting cylinder 4B rotates counterclockwise about the support shaft 8, so that the image-forming lens 2B rotates clockwise about the support shaft 222 by means of the rotating pin 23 fitted in the inclined cam groove 25. The curved lens surface 2Ba is thus located on the optical axis in face-to-face relation with the film surface, thereby assuming a state allowing the data light to be imprinted on the film. Thus, the data is imprinted if the LED 3 is made to emit light at this position.

Next, if the photographing image size is changed over to the image size of the panoramic size, the upper changeover mask plate 5 (see FIG. 1) moves downward by means of the changeover operation, and the connecting pin 11 moves downward by means of its fork 5b, so that the data imprinting cylinder 4B rotates clockwise about the support shaft 8. Hence, the image-forming lens 2B rotates counterclockwise about the support shaft 22 by means of the rotating pin 23 fitted in the inclined cam groove 25. The curved lens surface 2B*b* is thus located on the optical axis in face-to-face relation with the film surface, thereby assuming a state allowing the data light to be imprinted on the film. Thus, the data is imprinted if the LED 3 is made to emit light at this position.

In accordance with this fourth embodiment, the magnification and the f-number can be changed more freely than in the second embodiment.

As described above, in accordance with the present invention, in an image-size changeable camera, a data imprinting device which is displaced to a data-imprinting position corresponding to the image size by interlocking relation with a change in the photographing image size can be provided with a simple arrangement and high accuracy and at low cost.

Referring now to FIGS. 11 to 30, a description will be given of a further embodiment of the present invention.

Figure 12:
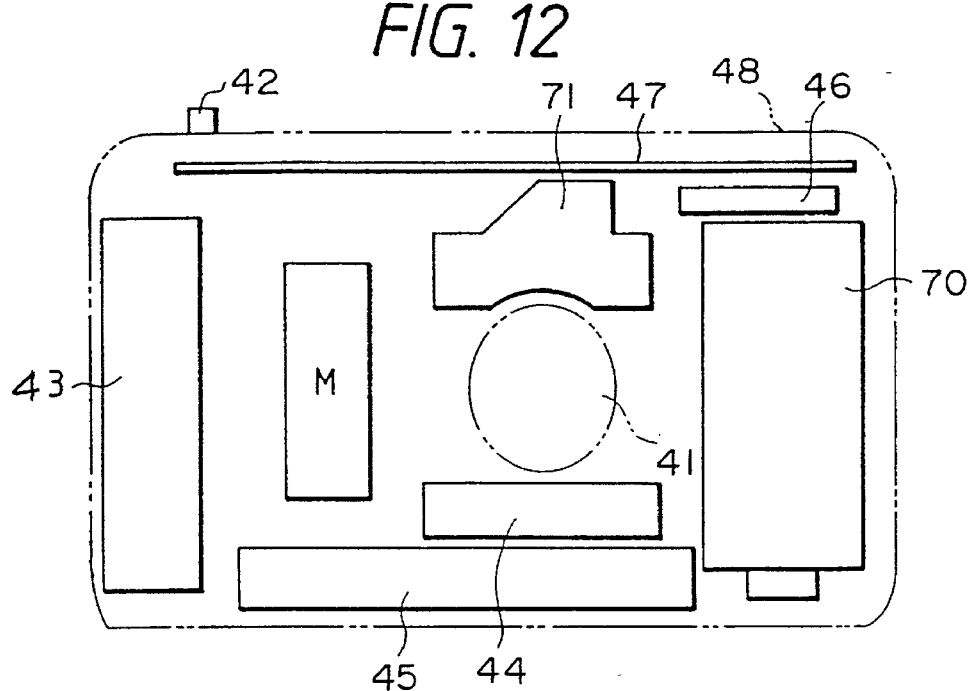
FIG. 12 is a layout diagram illustrating a schematic arrangement of the camera shown in FIG. 11.

FIG. 12 is a layout diagram illustrating a schematic arrangement of a camera to which the data imprinting device for a camera in accordance with the embodiment of the present invention is applied.

A taking lens frame 41 for supporting a taking lens is disposed substantially in the center of a camera body 48, and with this taking lens frame 41 placed in the middle a plurality of batteries 43 are loaded on the left-hand side of the camera body 4B, while a film cartridge 70 is loaded on the right-hand side thereof. A battery cover is provided on the camera body 4B to facilitate the removal of the batteries at the time of battery replacement, and the batteries 43 are moved from a battery chamber 120 (see FIG. 19).

A motor M is disposed at an intermediate position between the batteries 43 and the taking lens frame 41, and this motor M serves both as a driving source of a film advancing system and a film rewinding system and a driving source for focus adjustment of the taking lens. In addition, disposed below the taking lens frame 41 is a control mechanism 44 for controlling an amount of movement for the focus adjustment of the taking lens, amounts of film advance and rewind, the light-emitting timing of the date, the trigger timing of exposure start of a shutter, and so on. Further, disposed below the control mechanism 5 is a clutch mechanism 45 for shifting a gear train and a transmission system for transmitting the power of the motor M.

Meanwhile, an AF range finder and a viewfinder 71 are disposed above the taking lens frame 41, and a main board 47 of a circuit for controlling the camera system is disposed thereabove. This main board 47 is provided in an upper portion of the camera with a longitudinal length which is somewhat shorter than the longitudinal length of the camera body 48, and a film winding mechanism 46 is disposed between this main board 47 and the film cartridge 70. In addition, a release button 42 is provided on an upper end of the camera body 48 on the left-hand side thereof in such a manner as to project upward therefrom.

Figure 11:
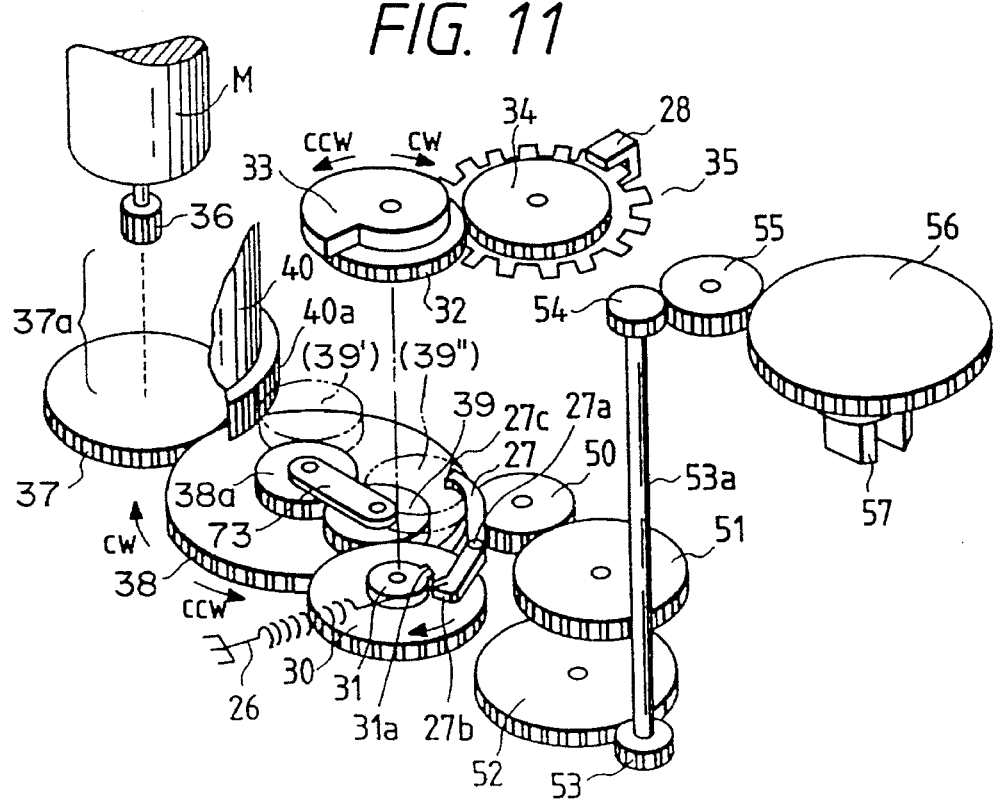
FIG. 11 is an enlarged perspective view illustrating a clutch mechanism of a camera to which a data imprinting device for a camera in accordance with an embodiment of the present invention is applied.

In FIG. 11, the motor M serving as the driving source is a reversible motor, and a pinion gear 36 is pivotally fixed integrally on its output shaft. This motor M is disposed in a hollow portion of a film take-up spool 40.

The pinion gear 36 is adapted to rotate a gear 37 by means of a reducing gear train 37*a*. This gear 37 meshes with a gear 38, and since the gear 38 is integrally formed with a sun gear 38*a* coaxially therewith, the rotational force of the motor M is transmitted to the sun gear 38*a*.

A planet gear 39 meshes with the sun gear 38*a*, and is connected thereto by means of a gear arm 73 which is a connecting arm. The planet gear 39 has slight friction (not shown) with respect to the underside of the gear arm 73, and the planet gear 39 also meshes with the sun gear 38*a* as described above, so that the gear arm 73 revolves in the direction in which the sun gear 38*a* rotates.

Driven gears which are focusing gears, such as an AF gear 30, a gear 50, and a gear portion 40*a* of a spool 40, are arranged at predetermined intervals on the path of revolution of the planet gear 39.

The rotational force of the gear 50 is transmitted to a gear 53 by means of a reduction gear 51 and a gear 52, and is then transmitted by means of a driving-force transmitting shaft 53*a*, which is pivotally fixed integrally to this gear 53, to a gear 54 which is pivotally fixed integrally to an upper end of the driving-force transmitting shaft 53*a*. The rotational force is further transmitted to a gear 56 by means of a gear 55. This gear 56 has pawls 57 projecting downward for rewinding the film by engaging a spool shaft in the cartridge.

In addition, the spool 40 has unillustrated pawls provided on its peripheral surface, and the arrangement provided is such that these pawls are used to catch perforations in the film to wind the film around the spool 40, thereby taking up the film.

A rewind stopper (hereafter referred to as the RW stopper) 27 is journaled on a shaft 27*a*, and is urged in the direction of CW in the drawing by means of a tensile spring 26. This RW stopper 27 has a projection 27*b* provided at one end thereof and a pawl 27*c* at the other end thereof.

The AF gear 30 has an RW stopper moving-in/out cam 31 formed integrally on its upper surface, and a projection 31*a* projects from a side surface of this RW stopper moving-in/out cam 31. The projection 27*b* of the RW stopper 27 is in contact with the cam surface of the RW stopper moving-in/out cam 31. When the AF gear 30 rotates and the projection 31*a* of the RF stopper moving-in/out cam 31 presses the projection 27*b*, the RW stopper 27 is rotated in the direction of CCW in the drawing, thereby allowing the pawl 27*c* of the RW stopper 27 to move into the path of rotation of the gear arm 73.

Figure 13:
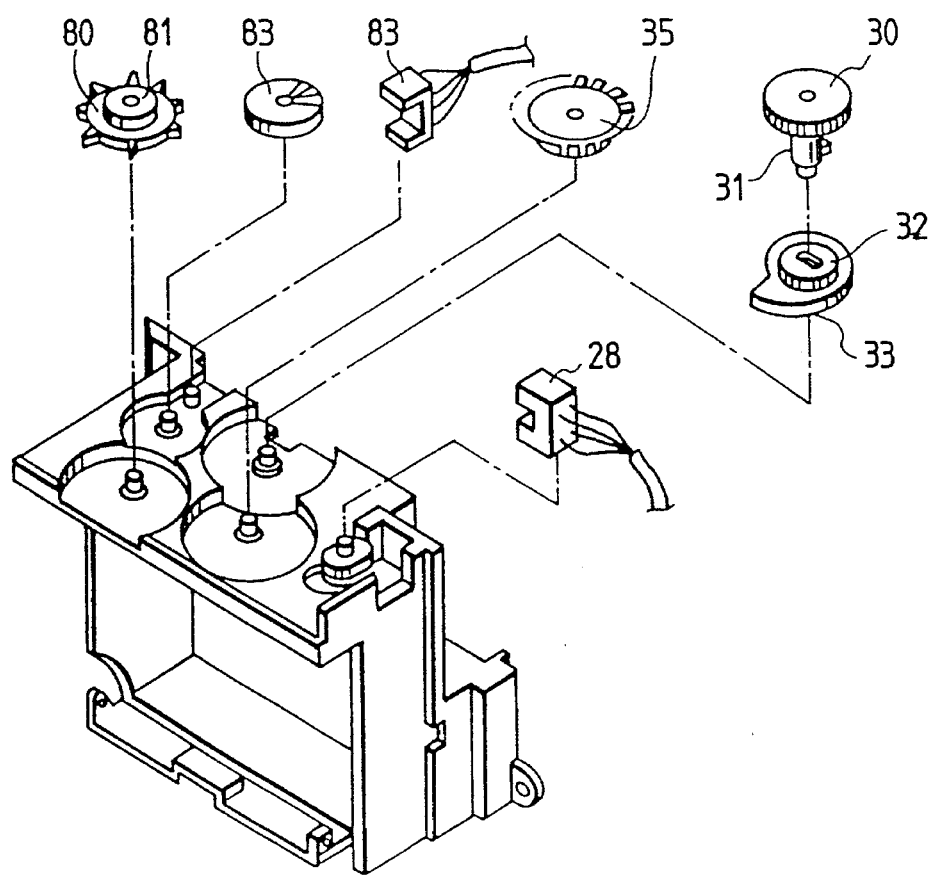
FIG. 13 is a perspective view illustrating a portion of a gear mechanism of the camera shown in FIG. 11.

The AF gear 30 is connected to a gear 32, which has an AF cam 33 formed integrally on its upper surface, via the RW stopper moving-in/out cam 31 by means of an elliptical projection and an elliptical recess, as shown in FIG. 13. As a result, the AF cam 33 is also rotated integrally in interlocked relation with the rotation of the AF gear 30. One turn of this AF cam 33 causes the taking lens to move forward from ∞ to the nearest distance.

A gear 34 meshes with the gear 32, and an autofocus photo interrupter (hereafter referred to as the AFPI) 28 for generating a lens advancement control pulse and an EE trigger pulse is provided for detecting the rotation of an AFPI gear 35 which is pivotally provided integrally with the gear 34. The AFPI gear 35 is a member in which portions for transmitting the light detected by the AFTP 28 and portions for shielding the same are provided alternately along the periphery thereof.

Figure 20:
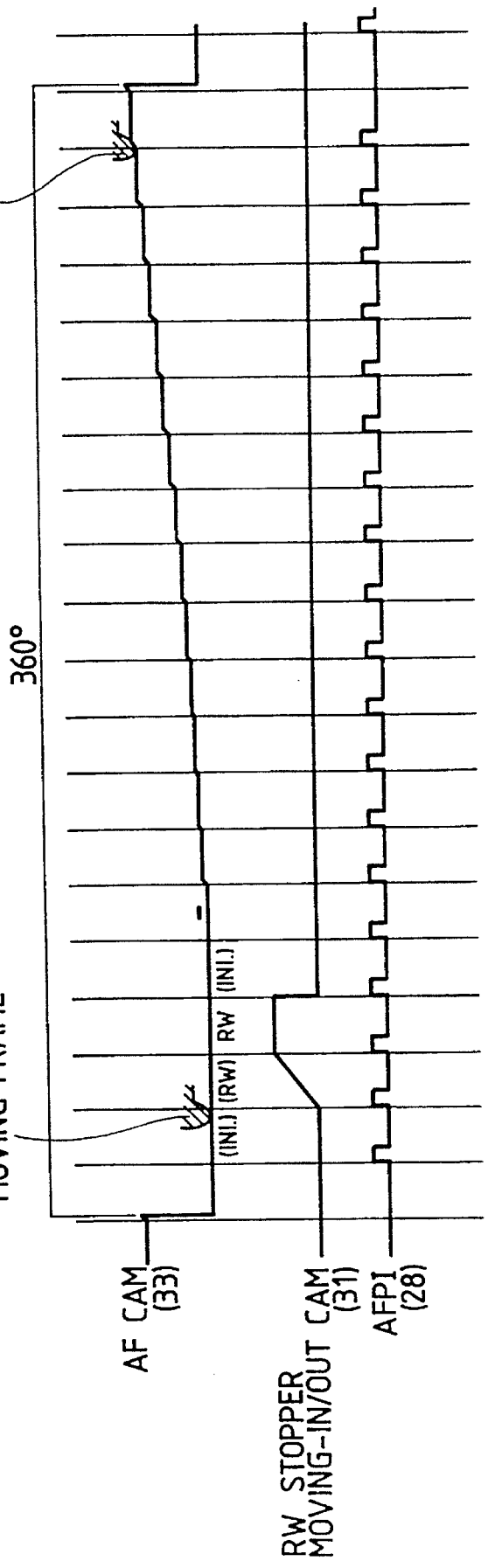
FIG. 20 is a timing chart illustrating the relationship among an AF cam, an RW stopper moving-in/out cam, and output pulses of an AFPI in the camera.

Referring now to FIGS. 11 and 20, a description will be given of the operation of the above-described camera.

When the motor M rotates, and the sun gear 38*a* rotates in the direction of CW in the drawing, the gear arm 73 also rotates in the direction of CW in the drawing, which in turn causes the gear arm 73 to be brought into contact with an unillustrated stopper to convert the revolving motion of the planet gear 39 into rotating motion, thereby transmitting the rotational force to the AF gear 30.

In the case of normal photographing, the AF cam 33 is rotatively driven to a certain position between ∞ and the nearest distance which corresponds to the result of distance measurement so as to move the taking lens forward, whereupon the motor M is stopped. When exposure is then effected and completed, the motor M further rotates the sun gear 38a in the direction of CW in the drawing, and resets the AF cam 33 to its initial position, and the motor M is stopped when the AF cam 33 is rotated to the initial position. Subsequently, the motor M is rotated reversely to wind the film by one frame, and the sun gear 38a is rotated in the direction of CCW in the drawing.

At this time, since the RW stopper 27 is in contact with a portion of the RW stopper moving-in/out cam 31 other than the projection 31a, the pawl 27c of the RW stopper 27 is located outside the path of the gear arm 73, so that the gear arm 25 is not retained by the pawl 27c.

When the sun gear 38a is rotated in the direction of CCW in the drawing, the gear arm 73 also rotates in the direction of CCW in the drawing and is brought into contact with the unillustrated stopper, thereby allowing the planet gear 39 and the gear portion 40a of the spool 40 to mesh with each other. Then, the rotational force of the motor M is transmitted to the film take-up spool 40, so that the spool 40 is rotated to wind the film by one frame.

Meanwhile, when the film is rewound, the motor M is rotated to rotate the sun gear 38a in the direction of CW in the drawing, which in turn causes the AF cam 33 to rotate to a rewind position (RW) shown in FIG. 20, and the motor M is rotated reversely. At this time, the projection 27b of the RW stopper 27 abuts against the projection 31a of the RW stopper moving-in/out cam 31, with the result that the RW stopper 27 rotates in the direction of CCW in the drawing, allowing its pawl 27c to enter the path of the gear arm 73.

Then, when the motor M is rotated reversely, the sun gear 38a rotates in the direction of CCW in the drawing, and the gear arm 73 also rotates in the same direction. Midway during this rotation, the rotation of the gear arm 73 is stopped by the pawl 27c of the RW stopper 27, and the planet gear 39 is set at the position indicated by reference numeral 39" to mesh with the gear 50, thereby allowing the rotational force to be transmitted to that gear 50. The rotational force thus transmitted to the gear 50 is transmitted consecutively to the gears 51, 52, 53, 54, 55, and 56, and rotates the pawl 57, thereby allowing the film to be rewound into the cartridge.

When all the film is thus rewound into the cartridge, the motor M rotates the sun gear 38a in the direction of CW in the drawing, which in turn causes the gear arm 73 to be brought into contact with the unillustrated stopper to rotate the AF gear 30. The motor M is stopped when the AF cam 33 is rotated to its initial position.

It should be noted that when the AF cam 33 is located at a position other than RW in FIG. 20, the pawl 27c of the RW stopper 27 is outside the path of the gear arm 73, so that when the film is automatically loaded, the AF cam 33 is retained at a cam stage (e.g., an initial position) other than RW, and the motor M is rotated reversely to wind the film.

Figure 15:
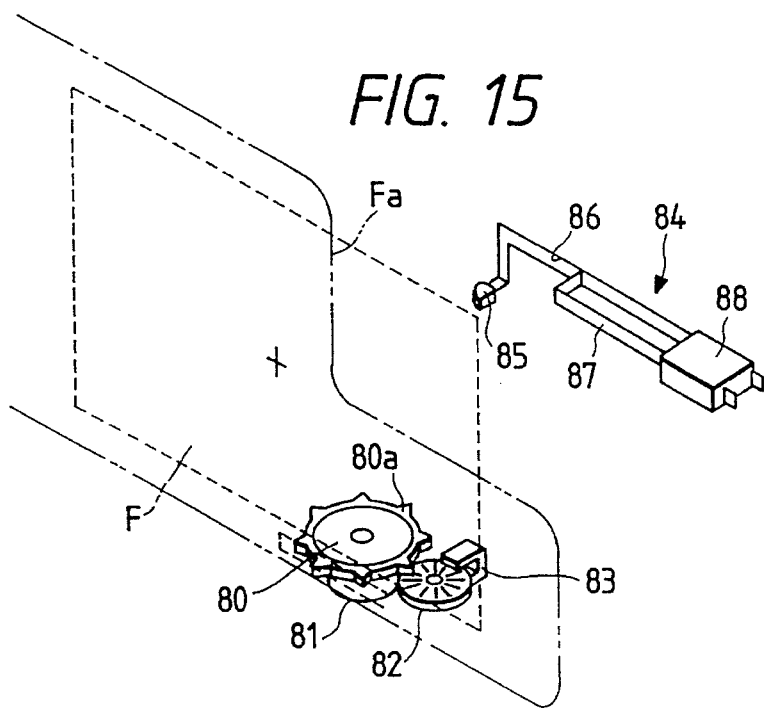
FIG. 15 is a perspective view illustrating the relationship between a film on the one hand, and a film switch and WPI on the other, in the camera.

Referring now to FIG. 15, a description will be given of a film feeding system and a unit for controlling the light-emitting timing for the date.

A sprocket 80 has eight pawls 80a projecting from its peripheral surface, and these pawls 80a are engaged in perforations provided in a film F. As a result, the sprocket 80 is adapted to move when the film F moves. This sprocket 80 has a gear 81 formed integrally on the underside thereof, and this gear 81 meshes with a gear 82. The gear 82 is provided with several dozens holes for detecting pulses of a winding photo interrupter (hereafter referred to as the WPI) 83 for generating a winding control pulse and a date imprinting pulse. Through this arrangement, the rotation of the sprocket 80 is detected by the WPI 183, and detected pulses are outputted from the WPI 83.

In addition, a film switch 84, which is turned on and off by the passage of an edge Fa of the film F, is provided on the upper right-hand side of the film F. This film switch 84 has two pieces 86 and 87 which project from a base 88 in the form of a leaf switch. A distal end portion of the piece 86 is temporarily bent downward and then bent again toward the film F, and a pawl 85 is provided at its tip. Meanwhile, a distal end portion of the piece 87 is bent toward the piece 86. As a result, when the film F is not loaded, the film switch 84 is turned on, and when the edge Fa of the film F passes the pawl 85 (in the rightward direction in FIG. 14), the piece 86 is separated from the piece 87 so that the film switch 84 is turned off.

A description will be given of such a film feeding system.

First, at the time of automatic loading, when the cartridge is set in the camera and the film is started to be wound, the edge Fa of the film F pushes the pawl 85 to turn off the film switch 84. Meanwhile, the WPI 83 starts to detect the pattern of the gear 82 rotated by the sprocket 80, detects a predetermined number of pulses necessary for automatic loading, and transmits a signal to the motor M.

Next, in the case of the feeding of one frame of the film in normal photographing, in the same way as at the time of automatic loading mentioned above, the pattern of the gear 82 rotated by the sprocket 80 is detected by the WPI 83 to detect pulses of one frame of the film.

Then, in the case of a film end, even if an electric current flows to the motor M, the film F is not moved and the sprocket 80 does not rotate. Hence, the WPI 83 is in set is the state of being unable to detect a pattern, and the arrival of the film end is detected by the fact that that time period exceeds a predetermined time.

In addition, in the case of film rewinding, as the film F is moved, the sprocket 80 is rotated and the signal is detected by the WPI 83. If all the film F is rewound into the cartridge, the sprocket 80 is not rotated, so that the WPI 83 is set in the state of being unable to detect the pattern, and the state of all the film F having been rewound into the cartridge is detected as the time period of rewinding exceeds a predetermined time.

Here, in the case of data photographing in which the date or the like is imprinted on the film F, there are various types of imprinting systems. One of the typical types is that, in the case where the date, for example, 94.11.28, is imprinted, six sets of seven segments are prepared, and the six sets of seven segments are simultaneously operated under the stationary condition of the film to thereby simultaneously imprint the six digit letters. Another one of the typical types is that even in the case where the date, 94.11.28 is to be imprinted, only one set of seven segments is provided and the seven segments are operated during the film transportation to thereby orderly imprint the six digit letters. The present invention may be applied to either one of these types. It is however noted that the latter type is applied in the embodiment. Namely, the letters are imprinted during the transportation of the film. The timing at which the characters of the date or the like are imprinted one at a time is detected by means of the signal of a pattern for detection by the WPI 83, which is formed in the gear 82. As the pattern (gear 82) is formed at the position where characters are imprinted on the image plane of the film, when the film F is fed, the pattern of the gear 82 is detected by the WPI 83, and the characters are imprinted consecutively one at a time within the image plane of the film F.

Figure 14:
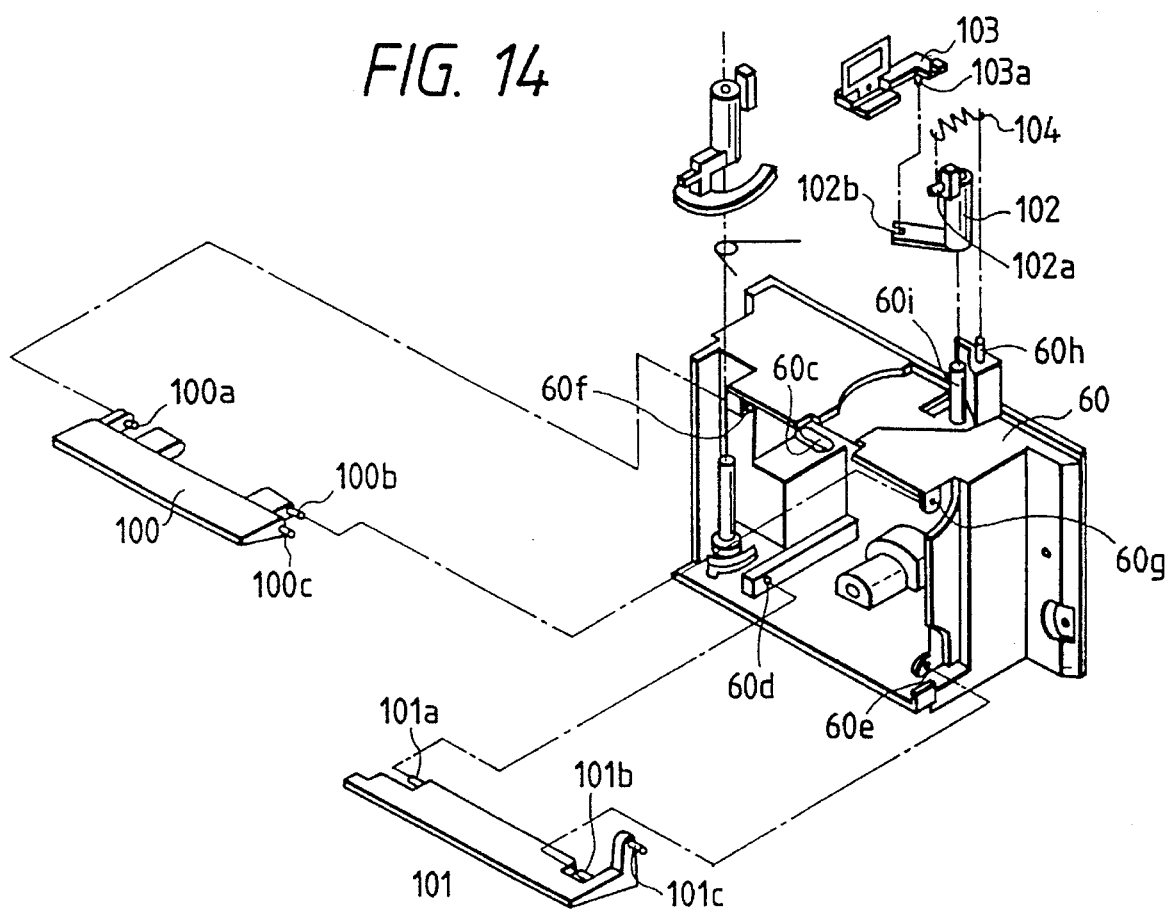
FIG. 14 is a perspective view, taken from the rear surface side, of a shutter mechanism body in the camera.

Referring to FIGS. 14 and 17, a description will be given of the changing over of the film exposure size.

As shown in FIG. 14, a panorama mask for changing over the film exposure size between the normal size and the panoramic size is provided on the rear side of an optical axis of a shutter mechanism body 60. This panorama mask is comprised of an upper mask 100' attached on the upper side and a lower mask 101 attached on the lower side. The upper mask 100 is pivotally supported as its fixing pins 100a and 100b are respectively fitted in holes 60f and 60g formed in the shutter mechanism body 60. The distal ends of these fixing pins 100a and 100b and the holes 60f and 60g into which the pins 100a and 100b are fitted are respectively formed in the shapes of keys and keyholes (not shown), so that the fixing pins 100a and 100b are rotatable and the fixing pins 100a and 100b and the holes 60f and 60g have the function of detents.

In addition, the lower mask 101 is pivotally supported as its fixing pins 101a and 101b are respectively fitted in holes 60d and 60e formed in the shutter mechanism body 60. The distal ends of these fixing pins 101a and 101b and the holes 60d and 60e are respectively formed in the shapes of keys and keyholes in the same way as the above-described mask 100, so that the fixing pins 101a and 101b and the holes 60d and 60e have the function of detents. Furthermore, as shown in FIGS. 17A and B, the respective masks 100 and 101 are engaged with a D holder 90 such that an upper mask pin 100c is slidably engaged with a D holder cam groove 90a, and a lower mask pin 101c with a D holder cam groove 90b.

Figure 16:
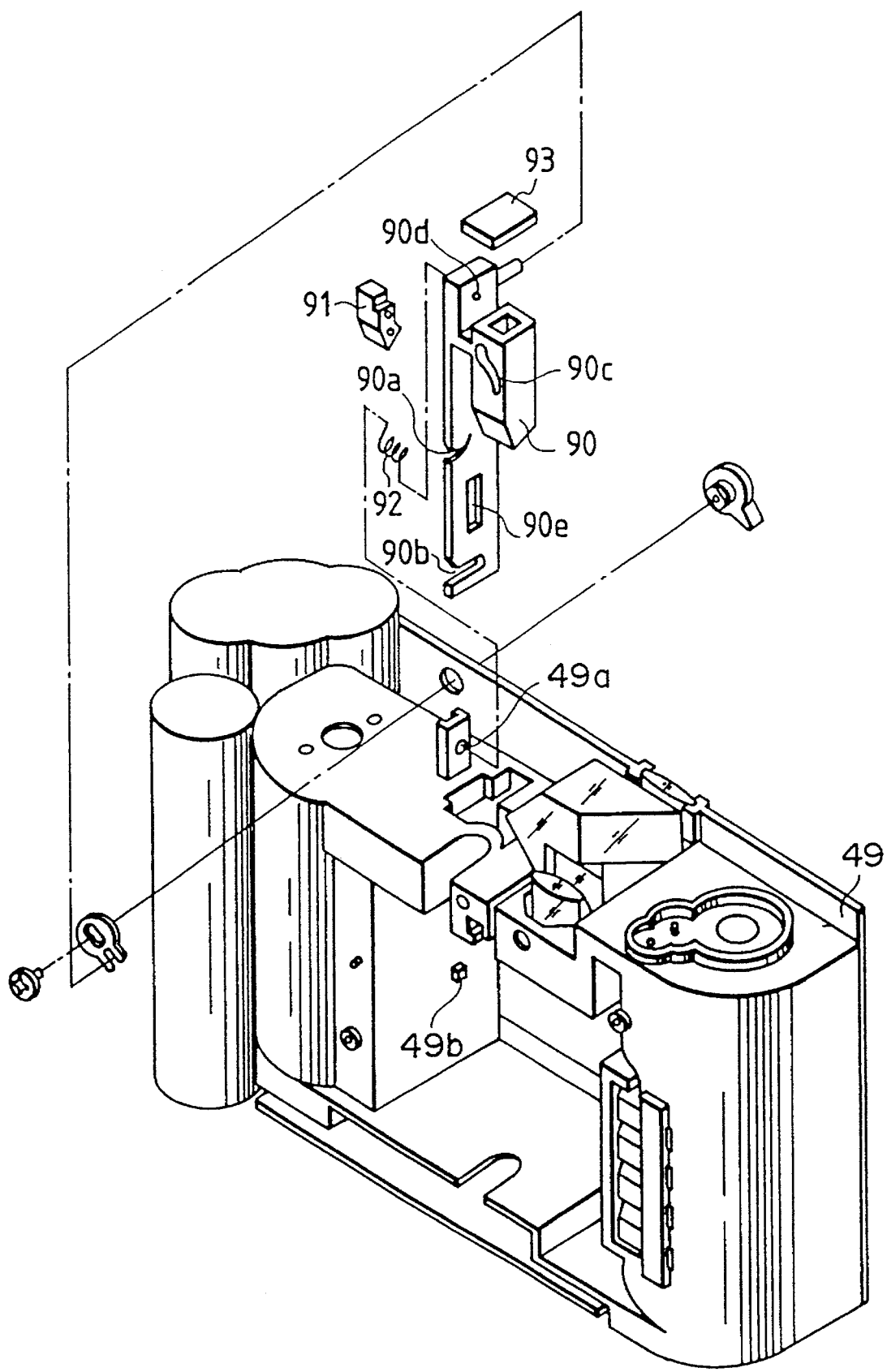
FIG. 16 is a perspective view illustrating the data imprinting device for a camera in accordance with the embodiment of the present invention and its peripheral components.

As shown in FIG. 16 (FIGS. 17A and 17B), the above-described holder 90 is made such that the D holder 90 at its elongated hole 90e is engaged by a guide stopper 11b of the main body 11 of the camera in such a manner as to be vertically slidable. A toggle spring 92 is provided between a spring-retaining hole 11a in the main body 11 of the camera and a spring-retaining hole 90d in the D holder 90 so that the holder 90 is biased to one side at the raised position and the lowered position of the holder 90. Also, affixed to the D holder 90 are an LED 93 for date imprinting as well as a prism 91 for focusing and deflecting light rays from this LED 93 onto the film surface.

Next, a description will be given of an optical system of the viewfinder of the above-described camera.

Figure 19:
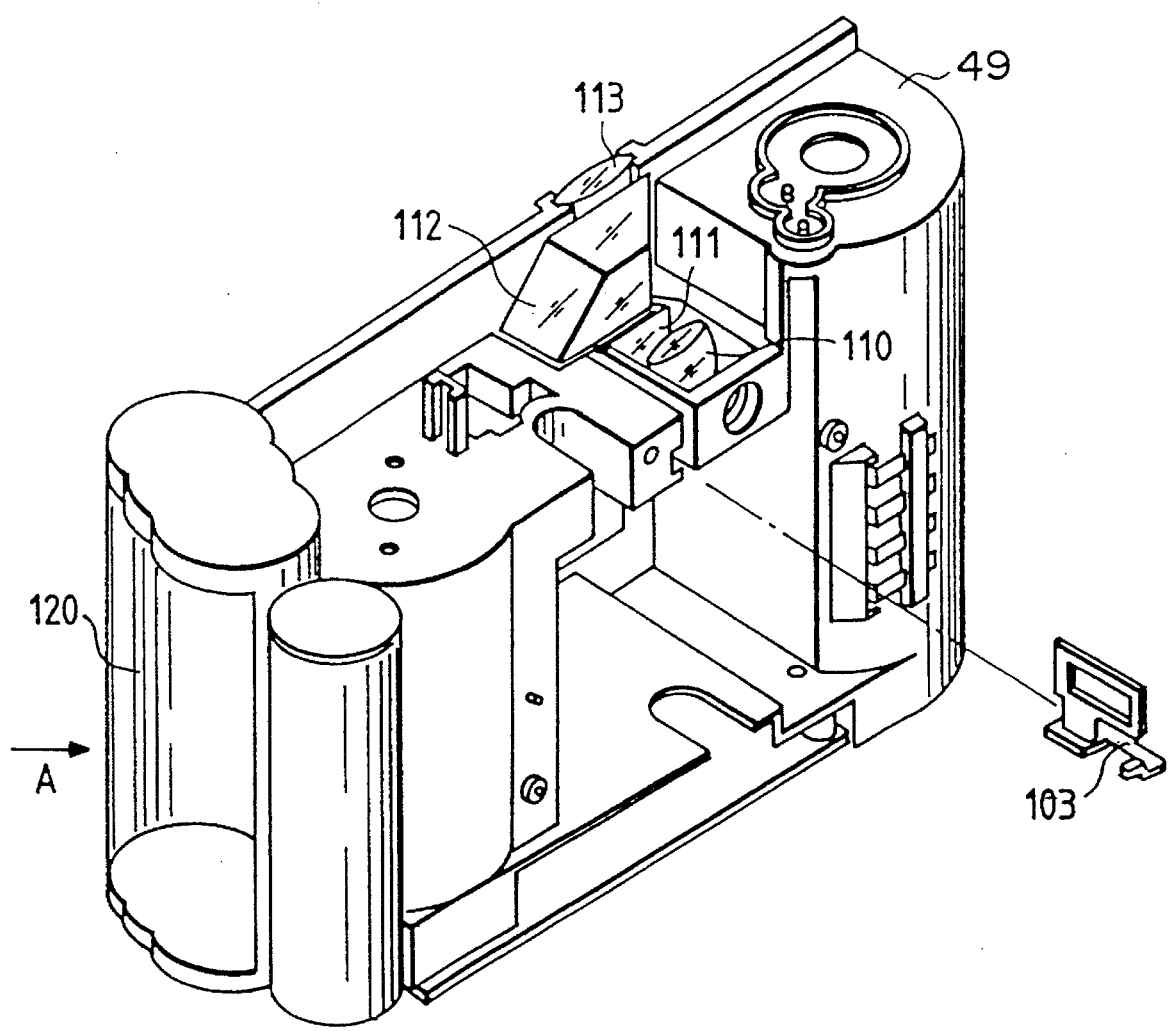
FIG. 19 is a perspective view, taken from another direction in front of the optical axis, of the main body of the camera shown in FIG. 16.

As shown in FIG. 19, an objective lens 110, a first prism 111, a second prism 112, and an eyepiece 113 are arranged consecutively along the optical axis of the viewfinder in an upper central portion of the main body 49 of the camera at a position slightly offset toward the right. The first prism 111 and the second prism 112 are adapted to invert the incident light rays top-to-bottom and left-to-right to obtain an erect image. In addition, an unillustrated image-forming plane is provided between the first prism 111 and the second prism 112.

In addition, as shown in FIG. 14, a support shaft 60i is provided uprightly on top of the shutter mechanism body 60, and a viewfinder field mask changeover lever (hereafter referred to as the FP lever) 102 is rotatably supported on the support shaft 60i. This EP lever 102 is a lever for transmitting the operation of the D holder 90 (see FIG. 16) to a panoramic field mask 103, and the transmission of the operation is effected as a U-groove at a tip of an arm projecting from a lower portion thereof is engaged with a boss 103a of the panoramic field mask 103. Furthermore, a boss 102a projecting from an upper portion of the FP lever 102 is engaged in a cam groove 90c (see FIG. 16) of the D holder 90. In addition, a spring 104 for urging the FP lever 102 during a changeover toward one side is stretched between the FP lever 102 and a boss 60h (see FIG. 14) of the shutter mechanism body 60.

Next, a description will be given of the operation of the above-described panorama changeover mechanism.

When the D holder 90 is moved from the normal state shown in FIG. 17(A) in the direction of the arrow (downward in the drawing) by an unillustrated outside operating member, the mask pins 100c and 101c rotate along the cam grooves 90a and 90b with the pins 100a and 100b and the pins 101a and 101b shown in FIG. 17(C) as their supporting shafts, respectively, so that the panoramic masks 100 and 101 are rotated therearound. Then, the D holder 90 is stopped in a state in which it abuts against the guide stopper 11b of the main body 49 of the camera, and the D holder 90 is fixed in position by the urging force of the toggle spring 92.

In addition, in the process in which the D holder 90 moves in the direction of the arrow (downward in the drawing), the boss 102a (see FIG. 14) of the FP lever 102 fitting in the cam groove 90c of the D holder 90 moves along that cam groove 90c, and the FP lever 102 rotates counterclockwise. As a result, the operation is transmitted to the boss 103a of the panoramic field mask 103 by means of the U-groove 102b of the FP lever 102, thereby allowing the field of view of the viewfinder to be changed over from the normal field mask to the panoramic field mask.

Furthermore, during this panorama changeover operation, since the positions of the prism 91 and the LED 93 (see FIG. 16 and FIG. 18) which are built in the D holder 90 vertically move integrally with the movement of the D holder 90, the position of date imprinting is changed over to a position falling in the normal exposure range to the panoramic exposure range, thereby permitting date imprinting in panoramic photography as well.

Figure 18A:
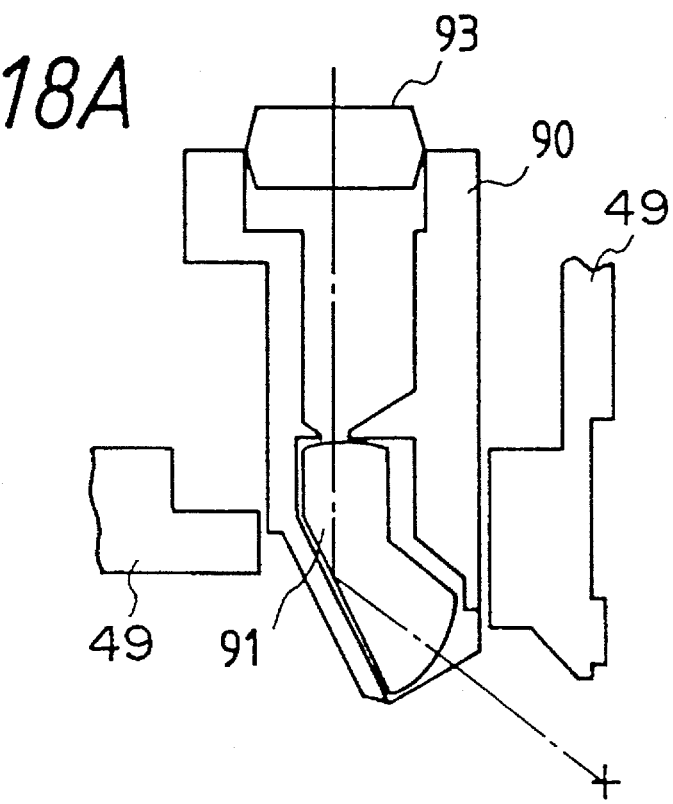
FIGS. 18A and 18B are a diagram of a panorama changeover mechanism in the data imprinting device for a camera in accordance with the embodiment, FIG. 18A being a side elevational view illustrating a normal state, and FIG. 18B being a side elevational view illustrating a panoramic state.

When the D holder 90 is moved upward and is restricted by the guide stopper 11b as shown in FIG. 17(A), the light rays for the date which are formed by the LED 93 and the prism 91 are focused onto the normal-size position of the film surface. The D holder 90, the LED 93, and the prism 91 are respectively disposed as shown in FIG. 18(A).

Figure 18B:
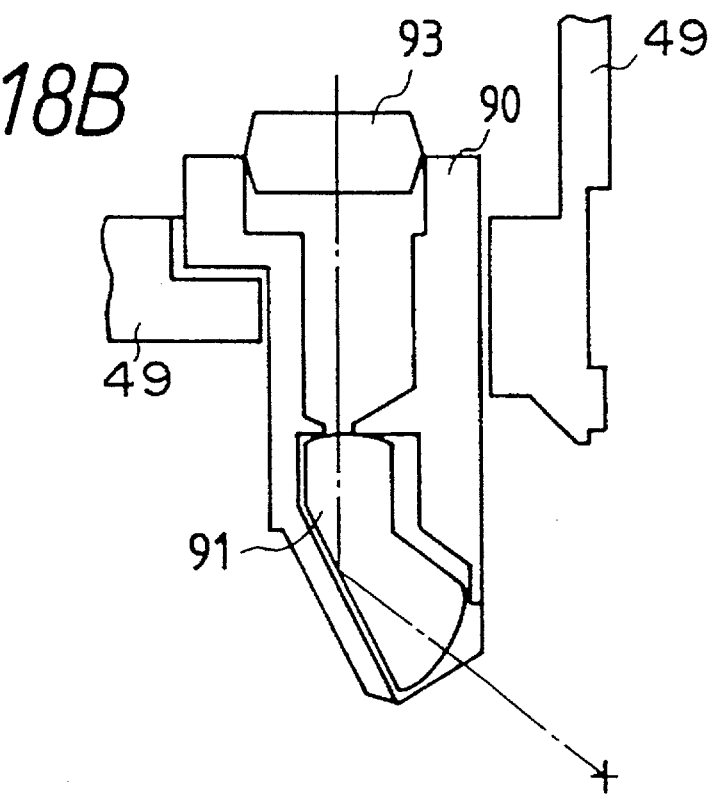

Meanwhile, when the holder 90 is moved downward and is restricted by the guide stopper 49b as shown in FIG. 17(B), the light rays for the date are focused onto the panoramic-size position of the film surface (FIG. 18(B)).

This completes the panorama changeover operation.

Figure 21:
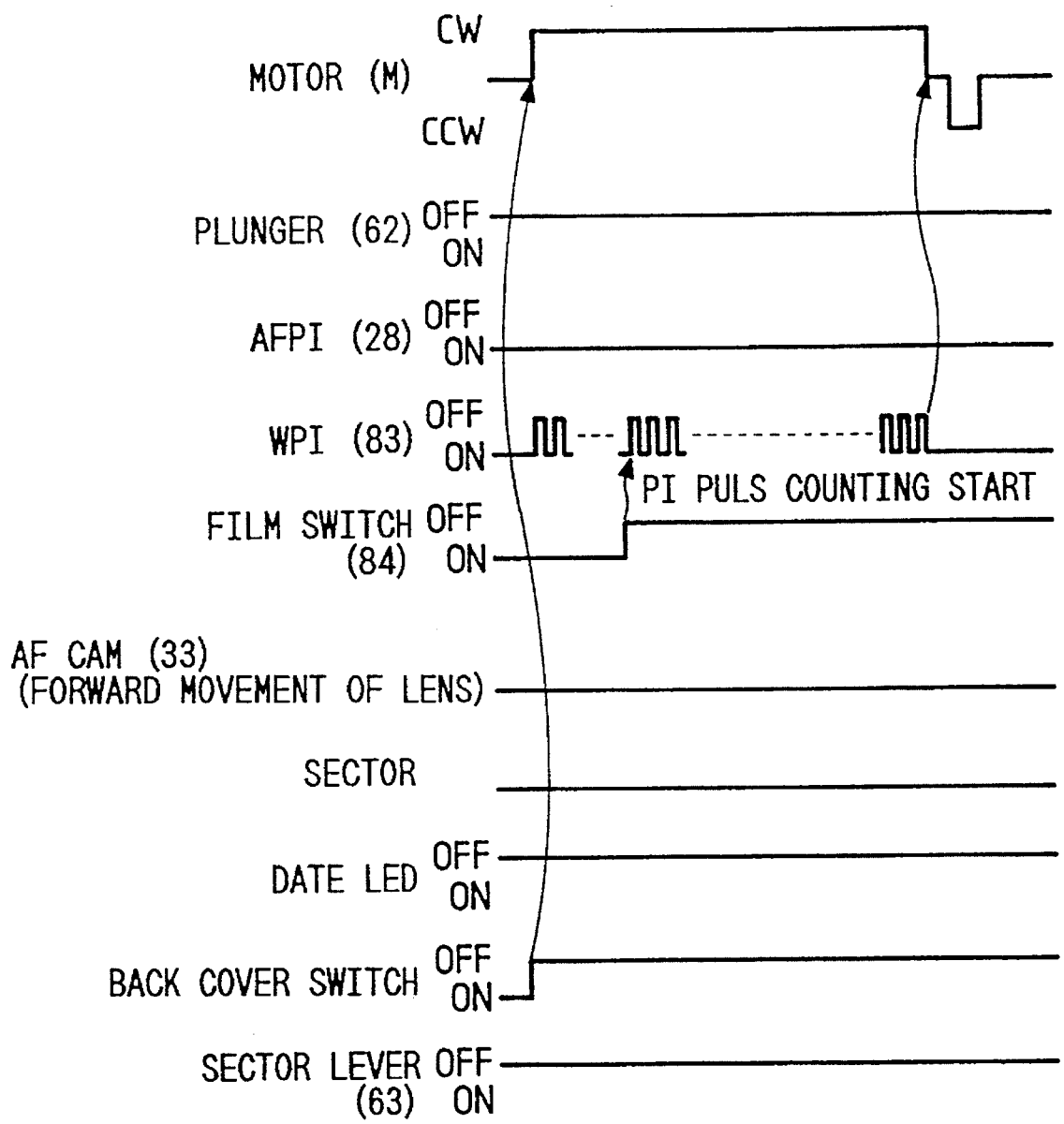
FIG. 21 is a timing chart illustrating outputs when the film is automatically loaded in the camera.

FIG. 21 shows a timing chart during automatic loading.

When the film cartridge is loaded, and a back cover is closed, a back cover switch is turned off from the on state, whereupon the motor M is rotated forward to start winding the film F. Then, the film switch 84 is turned off by the edge Fa of the film F, and at this time, the pulses of the WPI 83 are started to be counted from that time. Then, when the number of pulses of the WPI 83 reaches a predetermined value, it is determined that the automatic loading has been completed, and the motor M is stopped, and the motor M is rotated reversely to move the gear arm 25 to the AF gear 30 side (see FIG. 11).

Figure 22:
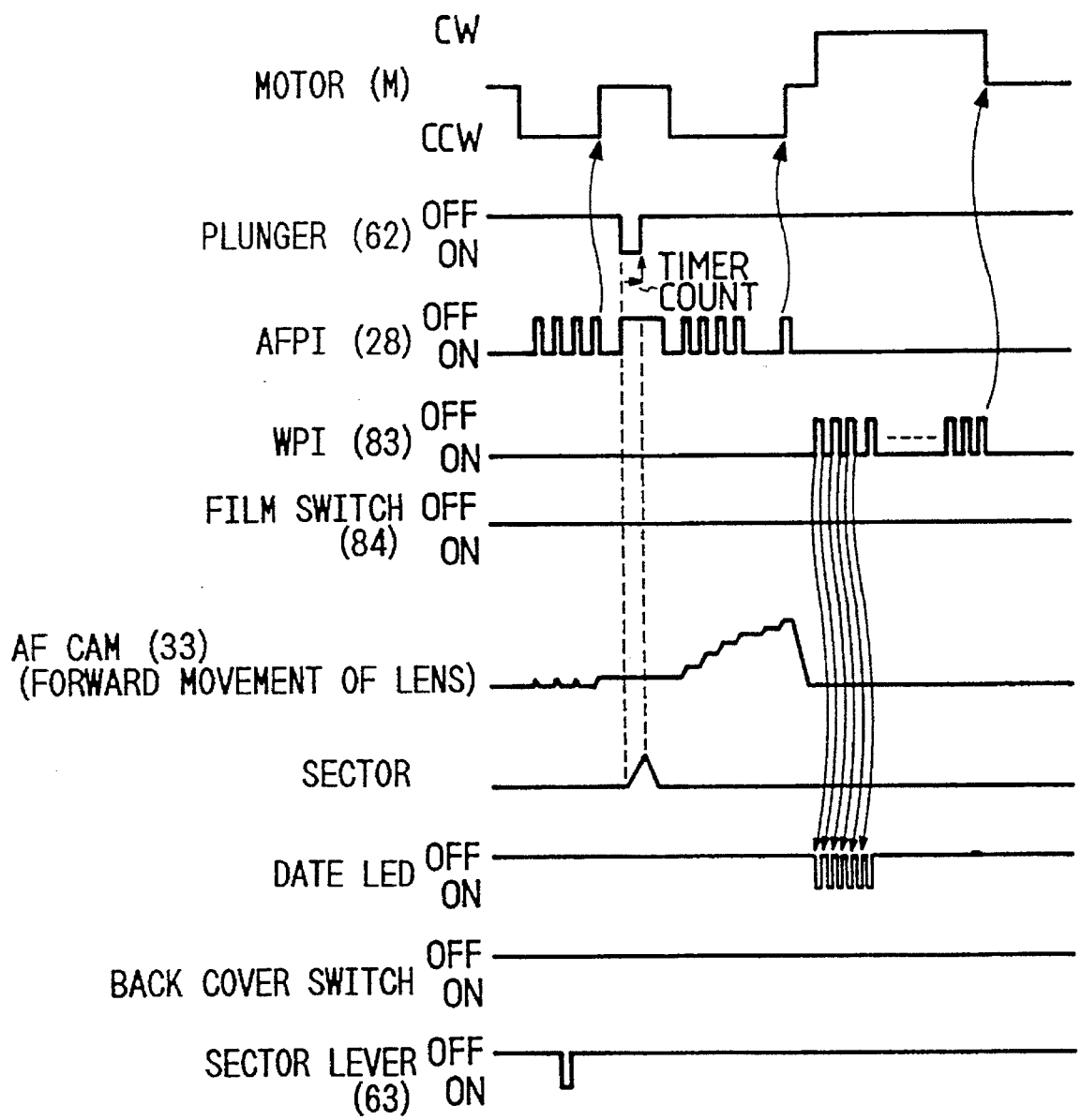
FIG. 22 is a timing chart illustrating outputs during the shooting of one frame.

FIG. 22 shows a timing chart during the shooting of one frame.

When the shutter is released, the motor M is rotated reversely to start moving the taking lens forward. When the taking lens is moved forward to a predetermined position, the motor M is stopped, and the plunger for driving the shutter sectors is turned on to effect exposure. Subsequently, the motor M is rotated reversely again to reset the taking lens to its initial position. Then, the motor M is rotated forward to start winding the film F. The date LED is made to emit light according to an output of the WPI 83 to imprint the date. When the pulses of the WPI 83 reach the predetermined pulses, the motor M is stopped.

Figure 23:
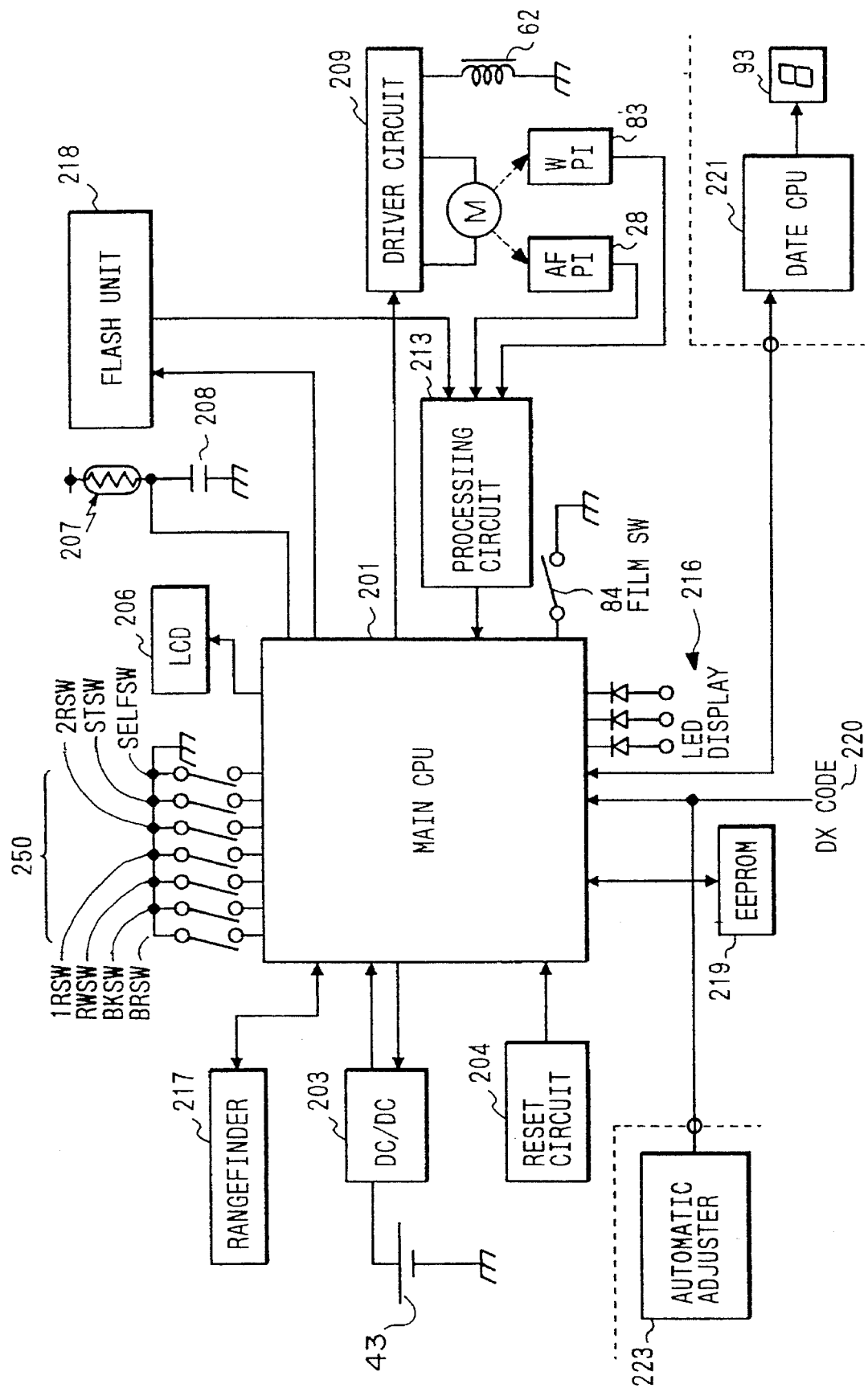
FIG. 23 is a block diagram illustrating various electrical components of the camera.

FIG. 23 shows a block system diagram of the camera.

As shown, this camera is provided with a main CPU 201 for controlling the overall operation, and the main CPU 201 effects the sequence control of the camera operation, the AF/AE calculation, the LCD/LED control, the electronic-flash control, the date imprinting control, the switch input control and the like.

The camera is loaded with the batteries 43 for supplying power as described above, and AA batteries, lithium batteries or the like are loaded in the battery chamber 120. These batteries 43 are connected to the main CPU 201' via a booster control circuit 203'. This booster control circuit 203' is started by the main CPU 201' and is designed to supply a constant voltage which is not affected by the fluctuations of the batteries 43.

In addition, a reset circuit 204' is connected to the main CPU 201' to reset the main CPU 201'.

Furthermore, various switches 205' provided in a switch operating section are connected to the CPU 201'. A 1st release switch 1R SW is turned on when the release button 42 (see FIG. 12) is pressed halfway, and this 1st release switch 1R SW is an AF/AE locking switch. A 2nd release switch 2R SW is made when the release button 42 (see FIG. 12) is pressed fully, and this 2nd release switch 2R SW is a shutter releasing switch. A barrier open/close switch BR SW is a switch of a barrier cover (which is not shown but well known) of the above-described sliding type, and is set in the on state when the barrier cover 131 is opened, so as to allow a display to be given on an LCD 206', which will be described later, and to render the overall camera capable of photographing. A rewind switch RW SW is a forced rewinding switch, and is used for rewinding at some midpoint in photographing. A back cover open/close switch BK SW is a switch of a back cover of the camera for freely winding the film upon detecting that the back cover has been closed. An electronic-flash switch ST SW is a switch for changing over the shooting mode with an electronic flash, and a self-timer mode changeover switch SELF SW is a switch for changing over the self-timer mode.

In addition, the following are respectively connected to the main CPU 201.

Reference numeral 206' denotes the LCD, and this LCD 206' is a liquid crystal display plate for displaying the frame number of the film F, the result of a battery check and the like.

Reference numeral 207' denotes CdS for metering, one end of which is connected to both a capacitor 208' and the main CPU 201'. The arrangement provided is as follows: The port of the main CPU 201' is first set to an output port, the capacitor 208' is discharged for a fixed time duration, the port is changed over to an input port after discharging, and the time until a determining voltage is reached in the main CPU 201' is monitored by the main CPU 201' so as to be used as exposure information.

Reference numeral 208' denotes the capacitor.

Reference numeral 209' denotes a driver circuit. The driver circuit 209' drives the motor 10 for moving the lens forward and winding and rewinding, as well as a plunger 62 for opening and closing a sector by means of a signal from the main CPU 201'.

Reference numeral 28 denotes the above-described autofocus photo interrupter (AFPI) for generating lens-forward-movement controlling pulses and EE-triggering pulses as mentioned above.

Reference numeral 83 denotes the photo interrupter (WPI) for generating pulses for winding controlling and date imprinting as mentioned above.

Reference numeral 213' denotes a processing circuit for effecting charging voltage detection of a flash unit and the above-described AFPI and WPI signal processing.

Reference numeral 62 denotes the plunger for opening and closing the sectors.

Reference numeral 84 denotes a film detection switch which is turned off when the film end is moved to a predetermined position during an idle feed.

Reference numeral 216' denotes an LED for displaying the AF in-focus condition, the out-of-focus condition, the permission of flashing, the self-timer and so forth.

Reference numeral 217' denotes a range finder which measures the distance in response to a signal from the main CPU 201' and transmits the distance measurement data thereby obtained to the main CPU 201' via a serial data bus.

Reference numeral 218' denotes a flash unit, and the stopping of the charging of this flash unit 218' is monitored and controlled by the main CPU 201' via the above-described processing circuit 213'.

Reference numeral 219' denotes a nonvolatile memory EEPROM which is capable of reading and writing for storing the frame number and the like.

Reference numeral 220' denotes an input for reading the film sensitivity from a DX code or the like provided on the film cartridge.

Reference numeral 221' denotes a date CPU which receives date imprinting signals from the timer function and the main CPU 201' via the serial data bus, and lights the above-described date imprinting LED 93.

Reference numeral 222' denotes the date imprinting LED.

Reference numeral 223' denotes an automatic adjuster used for performing the adjustment of the automatic exposure, automatic focusing and the like, at a factory, and the automatic adjuster 223' transmits adjustment data to the camera through a serial port. The main CPU 201' writes the adjustment data in the EEPROM 219'.

Figure 24:
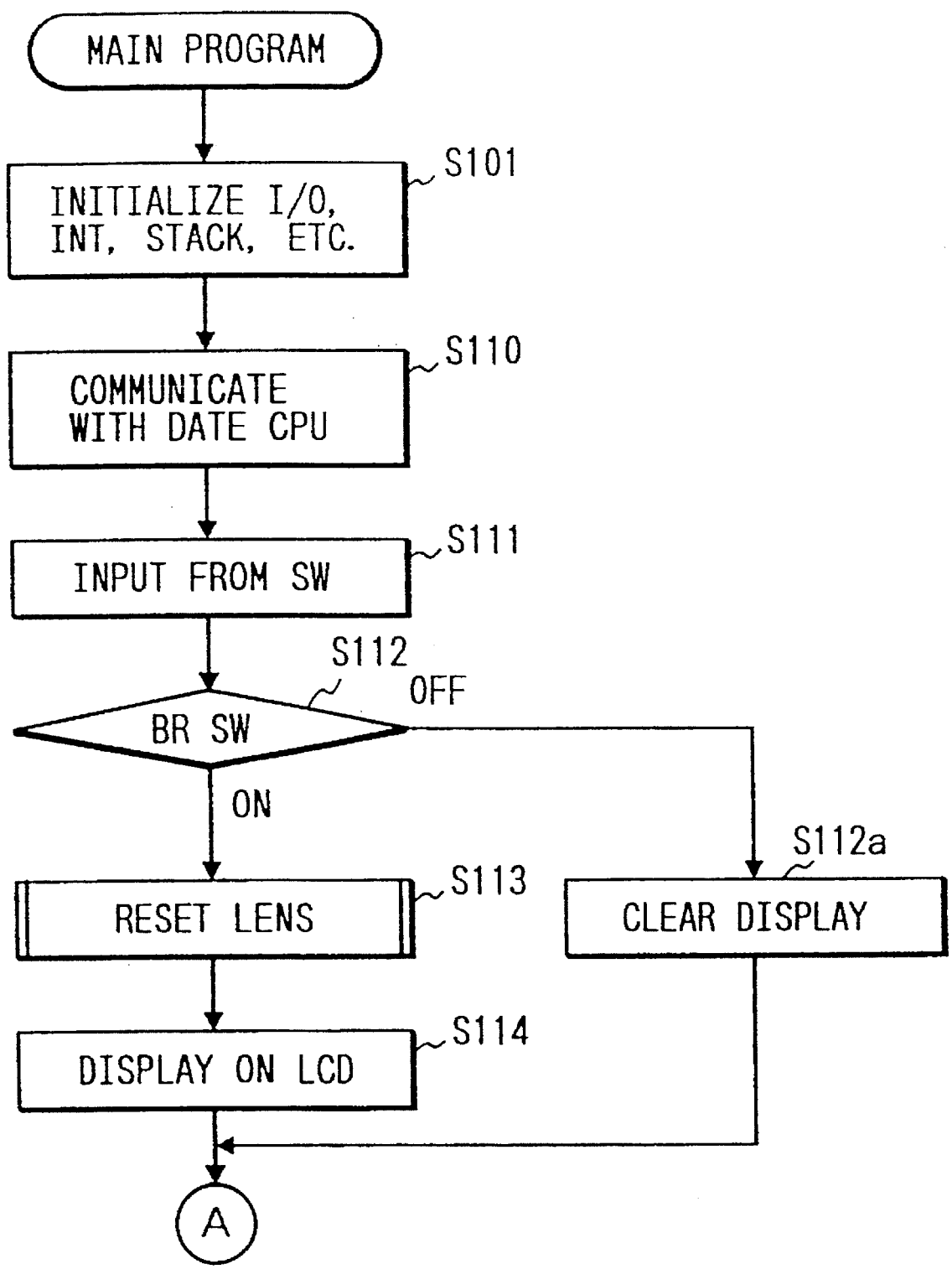
FIG. 24 is a flowchart illustrating a part of a main program of a main CPU of the camera.

FIG. 24 is a flowchart illustrating a main program of the main CPU 201'. By referring to this flowchart, a description will be given hereafter of the basic operation of the main CPU 201'.

When the batteries 43 are loaded in the camera, the reset circuit 204' is operated to start the operation of the main CPU 201', and effects initialization of the I/O, interruption and the like of the main CPU 201' (S101).

In Step S110, a reset command is transmitted to the date CPU 221' via the serial bus, and receives the data on the year, month, day, hour, and minute. Then, the date CPU 221' receives as its inputs the initial states of the various switches 205' and stores them in a predetermined RAM (S111). Then, the state of the barrier open/close switch BR SW inputted in Step S111 is tested (S112), and if it is off (barrier closed), the operation is branched off to Step S112a to clear the display of the LCD 206', whereupon the operation proceeds to Step S115. Meanwhile, if the state of the barrier open/close switch BR SW is on (barrier open), the taking lens is driven to its initial position in Step S113 to prepare for shooting.

Then, in Step S114 the film frame number, mode, date, and the like are displayed on the LCD.

Figure 25:
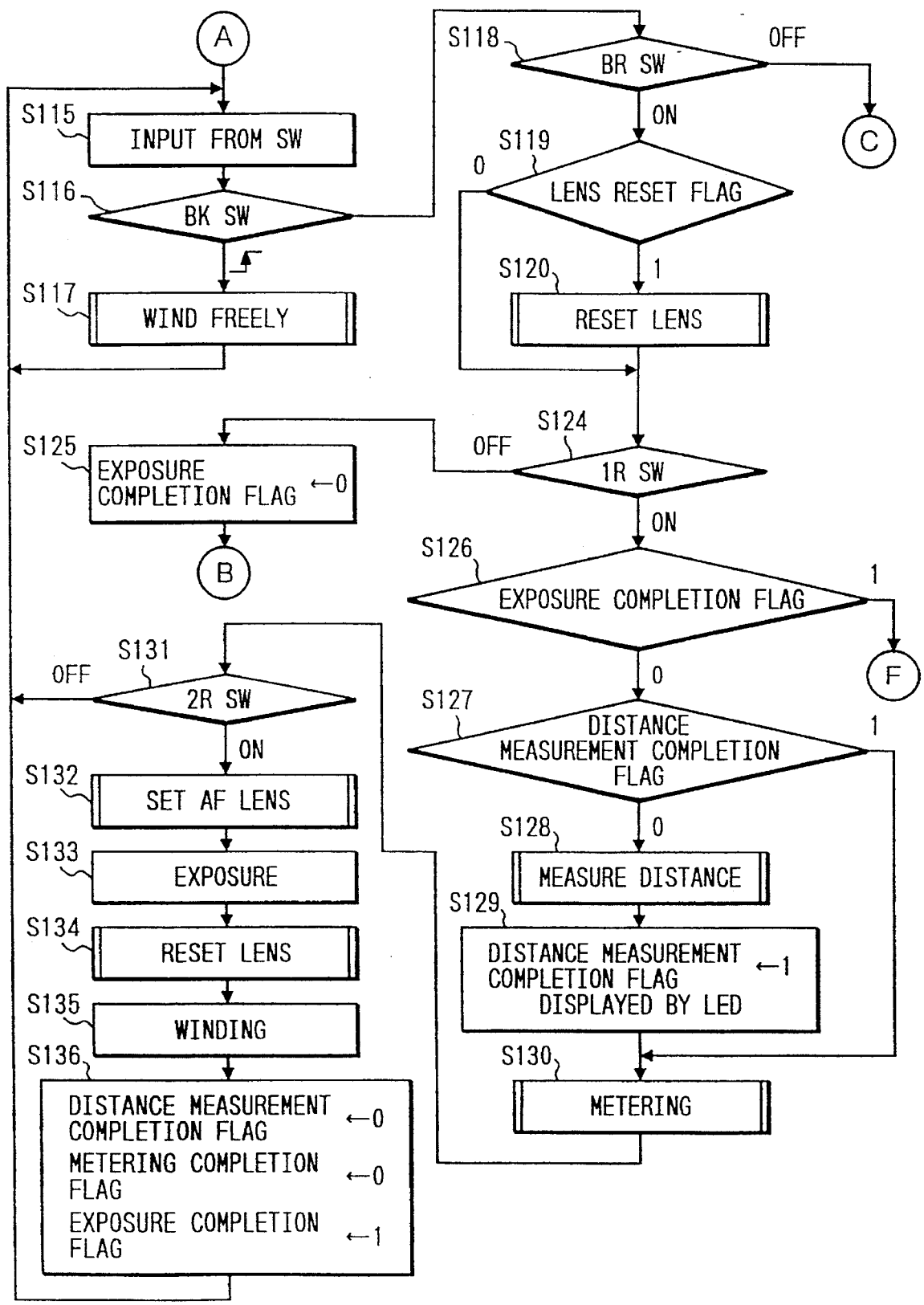
FIG. 25 is a flowchart illustrating another part of the main program of the main CPU of the camera.

Next, the operation proceeds to FIG. 25 in which Step S115 and subsequent steps are formed in a loop structure. In Step S115, the states of the various switches 205' are inputted in the same way as in Step S111 above, and at the same time a comparison is made between the same and the previously inputted data to determine a change in the state of on off/off on. In Step S116, the data on the back cover open/close switch BK SW is checked, and if the on off state, i.e., the shift from the open state to the closed state of the back cover 134, is detected, the free winding of the film (see FIG. 27) is executed in Step S117, and the operation then returns to Step S115. On the other hand, if there is no change in the back cover open/close switch BK SW, the barrier open/close switch BR SW is checked in Step S118.

If the barrier open/close switch BR SW is off, since the barrier cover 131 is closed and the camera is not in the state of being used, the operation proceeds to Step S149 (see FIG. 26) from the branch indicated at reference character C to turn off a DCDC converter. In Step S150, the display is cleared, and, in Step S151, a distance measurement completion flag, a metering completion flag, and an exposure completion flag are respectively cleared. The operation proceeds to Step 148 to prepare for the next opening of the barrier cover 131.

Meanwhile, if it is determined in Step S118 above that the barrier cover 131 is open, a lens reset flag is checked in Step S119. If the lens reset flag is 1, the lens is reset in Step S120.

In Step S124, the 1st release switch 1R SW is checked which is turned on when the two-stage release button 2 is pressed halfway. If the 1st release switch 1R SW is on, the exposure completion flag is checked in Step S126. When an exposure is conducted, this flag is set in Step S129. Meanwhile, the flag is cleared in Step S125 if the 1st release switch 1R SW is off. Once an exposure is conducted, another exposure cannot be conducted unless the release button 2 is released again.

If this exposure completion flag is 1, the operation proceeds to Step S145 (see FIG. 26) from the branch indicated at reference character F. Meanwhile, if the exposure completion flag is 0, a distance measurement completion flag is checked in Step S127. If this distance measurement completion flag is 1, the operation proceeds to Step S130 which will be described later.

In addition, if the distance measurement completion flag is 0, the distance is measured in Step S128. With respect to this distance measurement as well, the arrangement provided is such that the distance measurement is effected only once by using the distance measurement completion flag when the 1st release switch 1R SW is turned on. Then, when the distance measurement is completed, the distance measurement completion flag is set to 1 in Step S129, and a display by the LED is given by lighting or flashing the LED 216' for displaying the in-focus and out-of-focus states.

In an ensuing Step S130, a subroutine "metering" is carried out.

While the barrier is open, this metering is constantly executed irrespective of the on/off state of the 1st release switch 1R SW, so as to reduce the release time lag.

When the data necessary or exposure are obtained, the 2nd release switch 2R SW (the second stage in the release button) is checked in Step S131. If the 2nd release switch 2R SW is off, the operation returns to Step S115 to go through the loop in a state of exposure standby. If the 2nd release switch 2R SW is on, the AF lens is moved forward in Step S132, and the exposure, lens resetting, and winding are executed (S133, S134, and S135). Then, in Step S136, the distance measurement completion flag is set to 0, the metering completion flag is set to 0, and the exposure completion flag is set to 1, whereupon the operation returns to Step S115 above to assume a state of waiting for a switch input.

Figure 26:
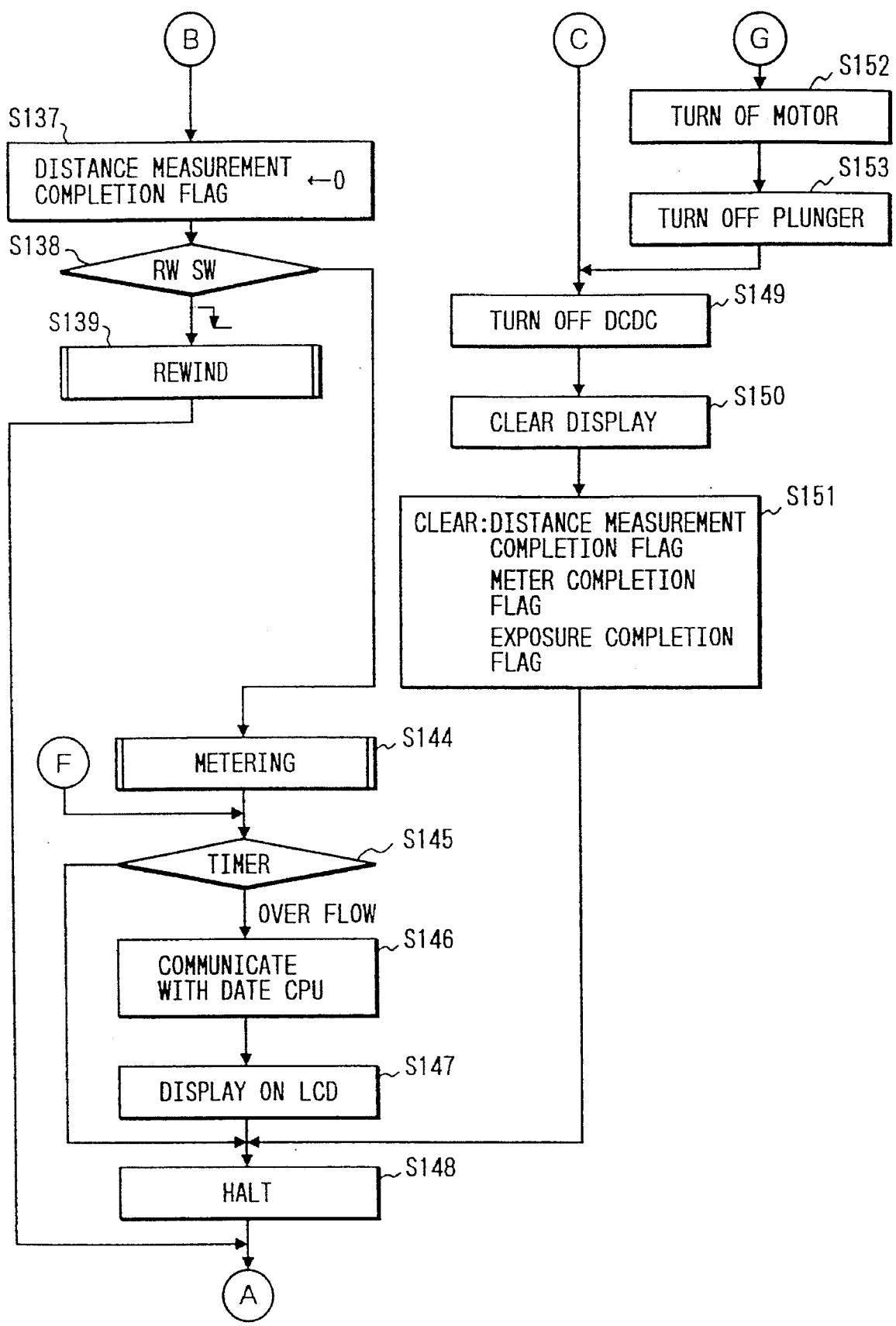
FIG. 26 is a flowchart illustrating still another part of the main program of the main CPU of the camera.

Returning to Step S124, if the 1st release switch 1R SW is off, the exposure completion flag is cleared in Step S125, and the operation proceeds to Step S137 shown in FIG. 26 from the branch indicated at reference character B, so as to clear the distance measurement completion flag to prepare for the next turning on of the 1st release switch 1R SW.

In Step S138, the rewind switch RW SW is checked, and if the turning on of this switch is detected, the film rewinding operation is executed (see FIG. 26) in Step S139, and the operation proceeds to Step S115 (see FIG. 25) from the branch indicated at reference numeral A. Meanwhile, if there is no change in the rewind switch RW SW, the metering processing similar to that described in Step S130 above is carried out.

After completion of metering, the timer is checked in Step S145. This timer determines execution intervals of the main loop, and the processing of Step S145 and subsequent steps is executed for each time duration set by the timer. If this timer is not overflowing, the operation proceeds to Step S148, while if the timer is overflowing, communication with the date CPU 221' is effected in Step S146. Here, data for determining the quantity of light for imprinting and the light-emitting time, such as film sensitivity, is transmitted from the main CPU 201', and data necessary for displaying the year, month, day, hour, minute and the like is received from the date CPU 221'. The data received from the date CPU 221', together with the aforementioned mode data and film frame number data, is displayed on the LCD 206' in Step S147.

Upon completion of the series of processing described above, in Step S148 a low current-consumption mode sets in by decreasing the clock frequency. It is when the main loop timer checked in Step S145 above is overflowing, or the state of any of the various switches has changed and an interruption has taken place that the operation exits from this mode and the operation is resumed starting with Step S115.

Figure 27:
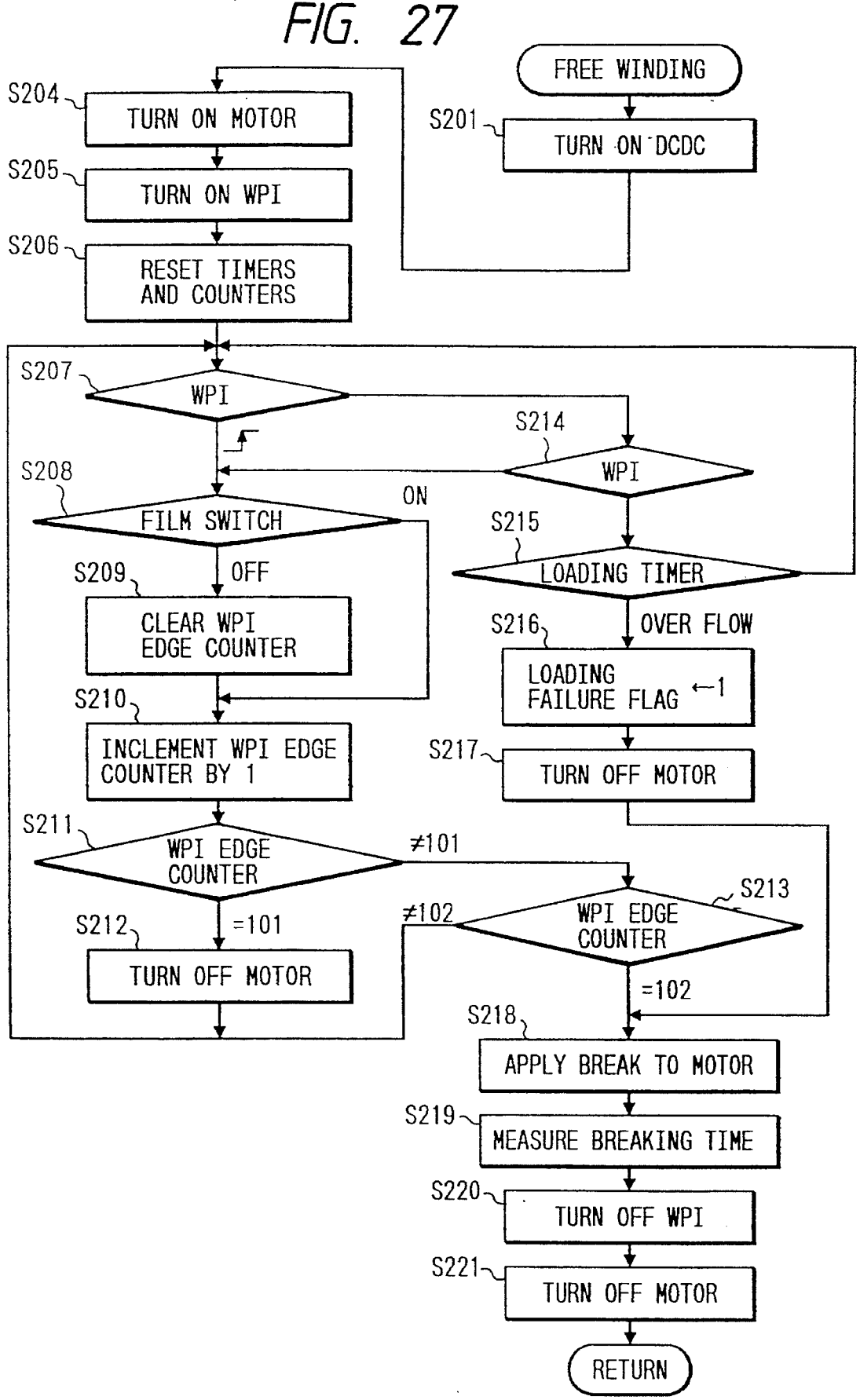
FIG. 27 is a flowchart illustrating a subroutine "free winding;"
Figure 28:
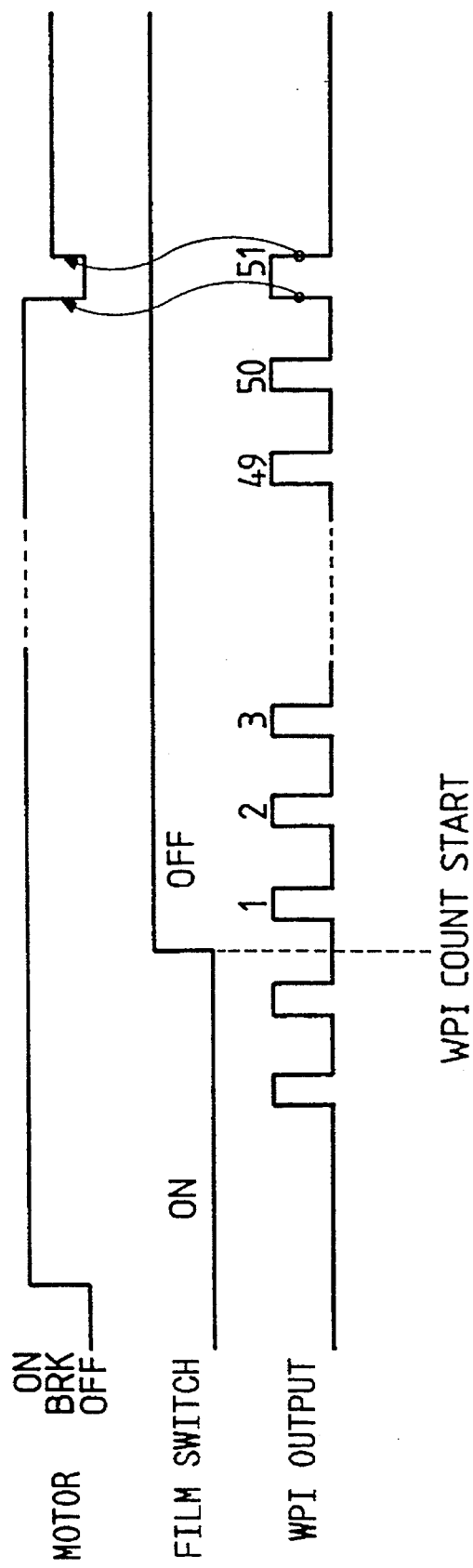
FIG. 28 is a timing chart illustrating the subroutine "free winding;"

FIGS. 27 and 28 show a timing chart of free winding of the film and a timing chart during the free winding of the film, respectively.

This film free winding is executed in Step S117 when the back cover is closed in Step S116 shown in FIG. 25 referred to above. After the DCDC converter is turned on in Step S201, the rotation of the motor M is started in Step S204.

When a perforation is caught by the pawl of the spool 40, and the film F begins to be pulled out of the film cartridge, the sprocket 80 rotates with the movement of the film F, and pulses are outputted from the WPI 83 (S205).

ID Step S206, various timers and counters which are used in the loop in Step S 207' and thereafter. In Steps S207 and S214, a change in the state of the WPI 83 is detected, and if there has been a change, the operation proceeds to Step S208. In Step S208, the state of the film switch 84 is monitored, and if the film switch 84 is off, a WPI edge counter is cleared in Step S209. This film switch 84 is a switch which is turned off when the film f has advanced to a predetermined position, and the subsequent frame advancing and imprinting are carried out by using as a reference the position where this film switch 84 was turned off.

When the WPI edge counter is cleared, the count of the counter is incremented in Step S210 each time the pulse of the WPI 83 is received, the motor M is turned off at an 101th edge (S211, S212), and a brake is applied to the motor M at a 102nd edge to stop the motor M (S213, S218).

Meanwhile, if the WPI edge is not detected in Steps S207 and S214, a loading timer is monitored in Step S215. If this loading timer is not overflowing, the operation returns to Step S207. In addition, if the pulse o the WPI 83 is not inputted after the lapse of a predetermined time, it means that the film has not been advanced, so that a loading failure flag is set when the timer has overflown (S215, S216). By means of this flag, a display of a free-winding failure or the like is given.

Then, the motor M is turned off in Step S217, a brake is applied to the motor M in Step S218, and the braking time is measured in Step S219. Subsequently, the WPI is turned off in Step S220, and the motor M is turned off in Step S221, thereby completing the operation.

Figure 29:
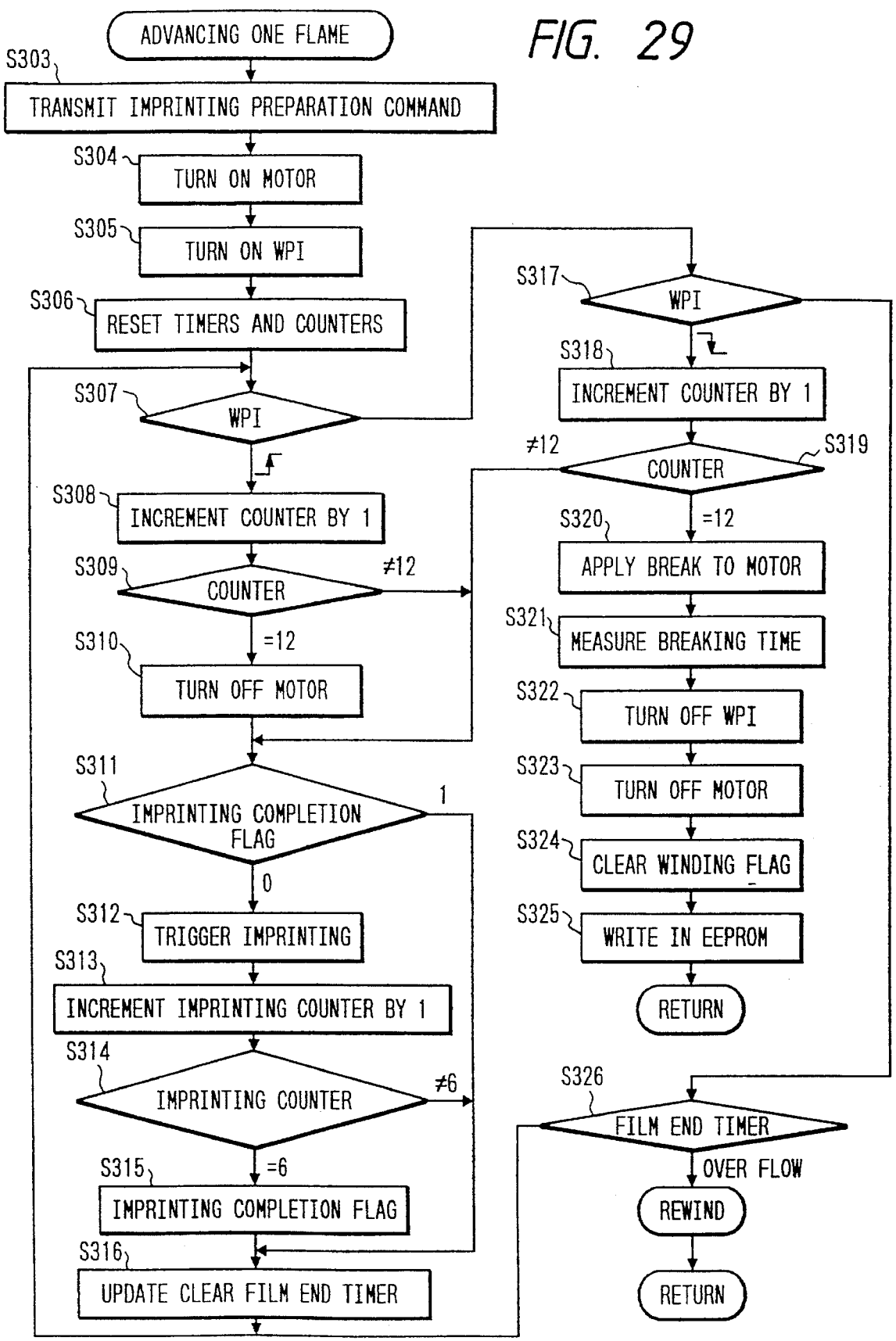
FIG. 29 is a flowchart illustrating a subroutine "advancing one frame of the film.

FIG. 29 is a flowchart illustrating the advancing of one frame of the film.

In Step S303, a imprinting preparation command is transmitted from the main CPU 201' to the date CPU 221'. Then, the date CPU 221' is set in the mode of waiting for trigger signals for imprinting within a predetermined time duration, and imprints one character at a time per trigger signal.

In Step S304, the motor M is started to rotate in the forward direction in the drawing, and in Step S305 the LED of the WPI 83 is lit. Then, in Step S306, the various timers and counters which are used in the program loop in Step S307 and subsequent steps are initialized.

In Steps S307 and S317, the state of the WPI is monitored, and if there has been a change in the signal (i.e., in Step S307, light transmission (0) light shielding (1), and in Step S317, light shielding (1) light transmission (0)), the operation branches off to effect the respective processing. In Step S307, if an on (0) off (1) edge of the WPI output is detected, an on and off edge counter is incremented by 1 in Step S308, and when the value of this counter has become 12, the excitation of the motor M is turned off (S309, S310). That is, at a 12th on and off edge and thereafter, the winding is effected by means of inertia (Steps S319 and S320 and FIG. 30).

Next, in Step S311, a date-imprinting completion flag is checked, and if it is determined that date imprinting has not been completed, a character-imprinting trigger signal is outputted to the date CPU 221' in Step S312. The, in Step S313, a imprinting counter is incremented by 1, and at a point of time when the imprinting of six characters has been completed, a date-imprinting completion flag is set (S314, S315), and the outputting of a subsequent imprint trigger is prohibited.

In addition, if an off → on edge is detected in Step S317 above, an off → on edge counter is incremented by 1 in Step S318. If it is determined in Step S319 that a 12th off → on edge has been reached, a brake is applied to the motor in Step S320, the braking time duration is measured in Step S321, the WPI 83 is turned off in Step S322, and the motor is turned off in Step S323, thereby completing the operation. Meanwhile, until the 12th off on edge is reached, the date imprinting processing is carried out utterly in the same way as in the case of the on off procedure.

In the above-described manner, date imprinting of a total of six characters is carried out in synchronism with each off on edge and on off edge. In addition, when an edge is detected, a film end timer is updated in Step S316. When neither the on off edge nor the off on edge is detected, the film end timer is checked in Step S326, and if that timer is overflowing, the operation proceeds with the rewinding sequence.

Figure 30:
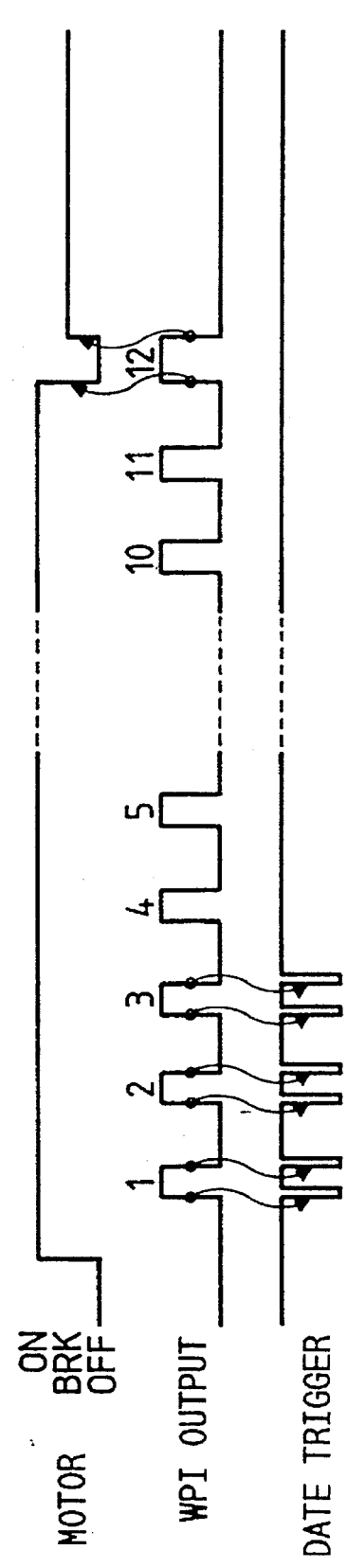
" and FIG. 30 is a timing chart illustrating the subroutine "advancing one frame of the film."

FIG. 30 is a timing chart illustrating the operation of advancing one frame of the film.

If the motor M is rotated, the spool 40 winds the film F. When the film F advances, the sprocket 80, which moves by following the same, rotates, and a pulse is outputted each time a notched portion of the gear 82 passes a slit in the WPI 83. Since one frame of the film comprises 12 pulses, a brake is applied to the motor M at a 12th pulse. The imprinting of the date is effected in synchronism with the edge of a third pulse after a winding start.

At a film end the sprocket 80 ceases to rotate, and the pulse of the WPI 83 is not generated, so that when an edge is not detected even after the lapse of a predetermined time duration (counted by the film end timer), the operation proceeds to film rewinding.

As described above, in accordance with the present invention, it is possible to provide a data imprinting device for a camera which has a simple construction and does not make the main body of the camera large in size.

What is claimed is:

1. A camera in which a photographic image field size is switchable from regular size to panoramic size by shielding upper and lower portions of the regular field size, said camera having a body and comprising:

data producing means for producing light of optical data to be imprinted on a film surface;

projecting means for projecting the light of optical data from the data producing means to the film surface; and sleeve-like holding means for holding said data producing means and said projecting means, said holding means being mounted in front of the film surface and at a position where a photographic light flux of a photographing lens is not shielded by said holding means, said holding means being mounted for angular movement on the body of the camera so that a front side thereof is movable between two positions close to and away from a photographic optical axis of the camera and for changing position of data imprinting on the film surface in response to switching of the photographic image field size.

2. The camera according to claim 1, wherein a toggle spring is interposed between said holding means and said camera body so that said holding means can be selectively biased between said two positions.

3. The camera according to claim 1, wherein said projecting means is slidable along said holding means so that a size of the imprinted light of data is changed in response to angular movement of said holding means between said two positions.

4. The camera according to claim 1, wherein said projecting means comprises in combination, two lens elements having different radii of curvatures so that size of the imprinted light of optical data varies, and said projecting means is rotatably mounted on said holding means so as to locate a data optical path of one of said two lens elements in response to angular movement of said holding means between said two positions.

5. The camera according to claim 1, wherein said data producing means comprises a light emitting element, and wherein a light emitting period of said data producing means varies in response to angular movement of said holding means between said two positions.

6. The camera according to claim 1, wherein said data producing means includes a light emitting element composed of seven segments forming a numeral eight, and a lower segment side is longer than an upper segment side.

* * * * *